US012730671B2

(12) United States Patent
Croxford et al.

(10) Patent No.: US 12,730,671 B2
(45) Date of Patent: Sep. 8, 2026

(54) COMPLEX RENDERING USING TILE BUFFERS

(71) Applicant: ARM Limited, Cambridge (GB)

(72) Inventors: Daren Croxford, Swaffham Prior (GB); Sharjeel Saeed, Cambridge (GB); Isidoros Sideris, Cambridge (GB)

(73) Assignee: Arm Limited, Cambridge (GB)

( * ) Notice: Subject to any disclaimer, the term of this patent is extended or adjusted under 35 U.S.C. 154(b) by 456 days.

(21) Appl. No.: 18/362,439

(22) Filed: Jul. 31, 2023

(65) Prior Publication Data

US 2024/0037835 A1 Feb. 1, 2024

Related U.S. Application Data

(60) Provisional application No. 63/394,053, filed on Aug. 1, 2022.

(30) Foreign Application Priority Data

Aug. 1, 2022 (EP) .................................... 22188051
Aug. 1, 2022 (EP) .................................... 22188053
(Continued)

(51) Int. Cl.
*G06F 9/48* (2006.01)
*G06F 9/50* (2006.01)
(Continued)

(52) U.S. Cl.
CPC .......... *G06F 9/4881* (2013.01); *G06F 9/4843* (2013.01); *G06F 9/505* (2013.01);
(Continued)

(58) Field of Classification Search
USPC .......................................................... 345/522
See application file for complete search history.

(56) References Cited

U.S. PATENT DOCUMENTS 5,890,007 A 3/1999 Zinguuzi
11,373,266 B2 6/2022 Das
(Continued)

FOREIGN PATENT DOCUMENTS

EP 3396524 10/2018
WO 2020/026158 2/2020

OTHER PUBLICATIONS

Great Britain Search Report for GB2214192.3 dated Apr. 12, 2023, 11 pages.

(Continued)

*Primary Examiner* — James A Thompson
*Assistant Examiner* — Kim Than T Tran
(74) *Attorney, Agent, or Firm* — NIXON & VANDERHYE P.C.

(57) ABSTRACT

There is provided an apparatus configured to operate as a shader core, the shader core configured to perform a complex rendering process comprising a rendering process and a machine learning process, the shader core comprising: one or more tile buffers configured to store data locally to the shader core, wherein during the rendering process, the one or more tile buffers are configured to store rendered fragment data relating to a tile; and during the machine learning process, the one or more tile buffers are configured to store an input feature map, kernel weights or an output feature map relating to the machine learning process.

21 Claims, 16 Drawing Sheets

(30) Foreign Application Priority Data

Aug. 1, 2022 (EP) .................................... 22386054
Sep. 28, 2022 (GB) ..................................... 2214192

(51) Int. Cl.

| | |
|---|---|
| ***G06F 9/54*** | (2006.01) |
| ***G06F 12/0842*** | (2016.01) |
| ***G06T 1/20*** | (2006.01) |
| ***G06T 1/60*** | (2006.01) |
| ***G06T 15/00*** | (2011.01) |

(52) U.S. Cl.

CPC .......... *G06F 9/542* (2013.01); *G06F 12/0842* (2013.01); *G06T 1/20* (2013.01); *G06T 1/60* (2013.01); *G06T 15/005* (2013.01); *G06F 2209/543* (2013.01); *G06F 2212/60* (2013.01); *G06F 2212/62* (2013.01)

(56) References Cited

U.S. PATENT DOCUMENTS

| | | | | |
|---|---|---|---|---|
| 2014/0327671 | A1 | 11/2014 | Nystad | |
| 2018/0096513 | A1 | 4/2018 | Park | |
| 2018/0308203 | A1 | 10/2018 | Appu | |
| 2018/0322386 | A1 | 11/2018 | Sridharan | |
| 2019/0206090 | A1 | 7/2019 | Ray | |
| 2020/0042860 | A1 | 2/2020 | Sun et al. | |
| 2020/0043123 | A1 | 2/2020 | Dash et al. | |
| 2020/0098422 | A1 | 3/2020 | Nguyen | |
| 2020/0104126 | A1 | 4/2020 | Pearce | |
| 2020/0193566 | A1* | 6/2020 | Croxford | G06T 3/4053 |
| 2020/0201690 | A1 | 6/2020 | Sankaralingam et al. | |
| 2020/0273231 | A1 | 8/2020 | Schied et al. | |
| 2021/0149803 | A1 | 5/2021 | Bernat | |
| 2021/0191761 | A1 | 6/2021 | Peng | |
| 2021/0200608 | A1 | 7/2021 | Gangani et al. | |
| 2022/0058476 | A1 | 2/2022 | Calidas | |
| 2022/0114495 | A1 | 4/2022 | Nurvitadhi | |
| 2022/0316917 | A1* | 10/2022 | Carbune | G01C 21/3881 |
| 2023/0050168 | A1* | 2/2023 | Frank | G06T 7/11 |

OTHER PUBLICATIONS

U.S. Appl. No. 18/362,405, filed Jul. 31, 2023, Croxford et al.

Office Action dated Feb. 13, 2026 for U.S. Appl. No. 18/362,405, 38 pages.

Great Britain Search Report for GB2212409.3 dated Jan. 11, 2023, 6 pages.

Examination Report for GB Application No. 2212409.3 dated May 7, 2024, 7 pages.

Office Action for GB Application No. 2212409.3 dated Aug. 22, 2024, 6 pages.

Office Action for GB Application No. 2212409.3 dated Oct. 21, 2024, 5 pages.

Examination Report for GB Application No. 2212409.3 dated Jan. 29, 2025, 4 pages.

U.S. Appl. No. 18/359,002, filed Jul. 26, 2023, Croxford et al.

Office Action dated Feb. 6, 2026 for U.S. Appl. No. 18/359,002, 21 pages.

Search Report Section 17 dated Mar. 8, 2023, GB Patent Application No. GB2213152.8.

Combined Search and Examination Report dated Apr. 12, 2023, GB Patent Application No. GB2214192.3.

* cited by examiner

| Tag | Data | | V | D | B |
|---|---|---|---|---|---|
| 0xF487 | 0FCD.... | 1592 | 1 | 0 | 0 |
| 0xD111 | 17AC.... | 29C0 | 1 | 0 | 1 |
| | ⋮ | | | | |

COMPLEX RENDERING USING TILE BUFFERS

CROSS-REFERENCE TO RELATED APPLICATIONS

This application claims priority to GB 2214192.3 filed Sep. 28, 2022, U.S. 63/394,053 filed Aug. 1, 2022, EP 22188051.1 filed Aug. 1, 2022, EP 22188053.7 filed Aug. 1, 2022, EP 22386054.5 filed Aug. 1, 2022, the entire contents of each of which are hereby incorporated by reference.

TECHNICAL FIELD

The present technique relates to data processing and has relevance to the area of graphics processing.

DESCRIPTION

The recent increase in the use of AI has led to the emergence of complex graphical rendering processes in which traditional rendering techniques are coupled with machine learning processes in order to improve efficiency of the overall rendering process.

SUMMARY

Viewed from a first example configuration, there is provided an tile-based graphics processing system comprising: a shader core configured to perform a complex rendering process comprising a rendering process and a machine learning process, the shader core comprising: one or more tile buffers configured to store data locally to the shader core; wherein during the rendering process of the complex rendering process, the one or more tile buffers are configured to store rendered fragment data relating to a tile; and during the machine learning process of the complex rendering process, the one or more tile buffers are configured to store an machine learning relating to the machine learning process.

Viewed from a second example configuration, there is provided a complex rendering process comprising: performing a rendering process of the complex rendering process in which one or more tile buffers are configured to store rendered fragment data relating to a tile; and performing a machine learning process of the complex rendering process in which the one or more tile buffers are configured to store an machine learning data relating to the machine learning process.

Viewed from a third example configuration, there is provided a non-transitory computer-readable medium to store computer-readable code for fabrication of an apparatus configured to operate as a tile-based graphics processing system comprising: a shader core configured to perform a complex rendering process comprising a rendering process and a machine learning process, the shader core comprising: one or more tile buffers configured to store data locally to the shader core; wherein during the rendering process of the complex rendering process, the one or more tile buffers are configured to store rendered fragment data relating to a tile; and during the machine learning process of the complex rendering process, the one or more tile buffers are configured to store an machine learning data relating to the machine learning process.

BRIEF DESCRIPTION OF THE DRAWINGS

The present technique will be described further, by way of example only, with reference to embodiments thereof as illustrated in the accompanying drawings, in which.

DESCRIPTION OF EXAMPLE EMBODIMENTS

Figure 1:
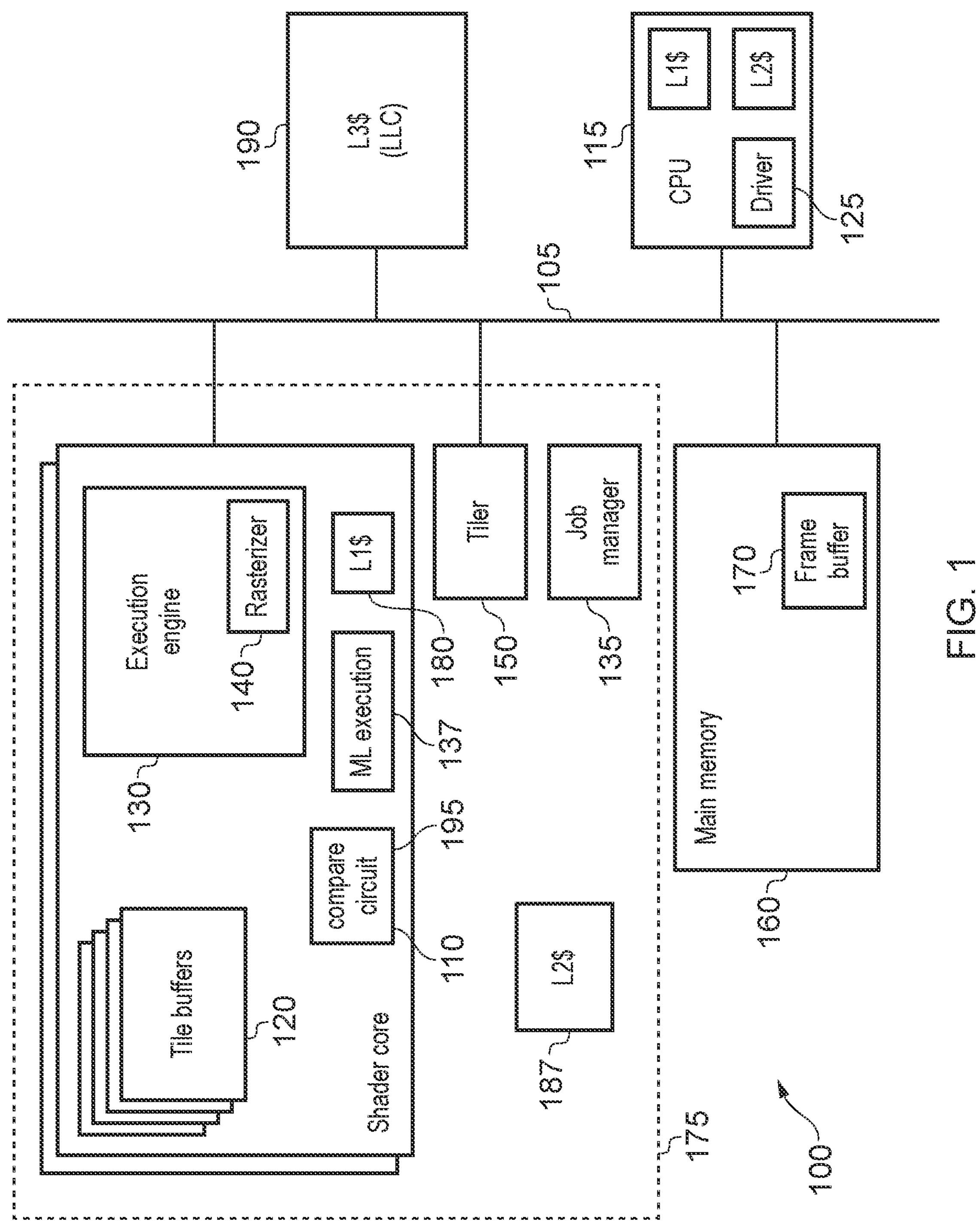
FIG. 1 illustrates an example data processing apparatus.

Before discussing the embodiments with reference to the accompanying figures, the following description of embodiments and associated advantages is provided.

In accordance with one example configuration there is provided an apparatus configured to operate as a tile-based graphics processing system comprising: a shader core configured to perform a complex rendering process comprising a rendering process and a machine learning process, the shader core comprising: one or more tile buffers configured to store data locally to the shader core; wherein during the rendering process, the one or more tile buffers are configured to store rendered fragment data relating to a tile; and during the machine learning process, the one or more tile buffers are configured to store an input feature map, kernel weights or an output feature map relating to the machine learning process.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output for a tile sub-region, is stored in a tile buffer. The tile buffer is provided as part of RAM that is located on (local to) the graphics processor shader core. Once the render output for a tile is complete the contents of the tile buffer is typically written to a frame buffer in main memory.

The render output data array may typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

A shader core is typically used for the execution of a small program (a shader). Such a shader can be executed on a tile, a contiguous block (often a square) of fragment data (e.g. colour, depth, alpha, surface normal values) that forms part of a frame. Tile buffers are used to store the fragment data while it is operated on by the shader. A shader may store fragment data relating to a tile of rendered data in the tile buffer. The fragment data generated by the shader in a rendering process and stored in the tile buffer may be image data. However, for example in a deferred shading rendering process, the fragment data generated by the shader may comprise at least one of image data, positions, normal, materials, depth data. This information may be stored in a buffer, known as a G-buffer (geometry buffer). A portion of this fragment data, the fragment data associated with a tile, may be stored in a tile buffer.

In practice, certain rendering techniques are slow, computationally expensive, and/or power hungry to operate and may require numerous complex shaders to be executed. One way to improve the efficiency of such a process is to make use of machine learning techniques. Here, a small amount of rendering takes place and machine learning techniques are then used to complete the rendering process. However, this can lead to inefficiencies as data is moved to and from the main memory and GPU. Sometimes this can involve compression/decompression taking place on the data. The situation is made even more complicated when, once the machine learning process has been performed, the tiles must be moved back into the shader cores for further processing to be performed. The inventors of the present invention have realised that substantial efficiency can be gained by using the shader cores themselves to perform the machine learning process. In this way, each tile can be kept within the tile buffers themselves, obviating need for movement of the data back and forth (and for any required compression/decompression). The tile buffers can then be used in the generation of feature maps (e.g. input feature map and output feature maps) during the machine learning process. Furthermore, since machine learning operations are typically mathematical and highly parallelised in nature, shader cores, which also perform highly parallelised mathematical operations, can be highly suited to such tasks. This can be achieved on an execution engine using a shader program or can be achieved using a specialised machine learning processing unit within the shader core itself. Note that the machine learning need not be applied in direct respect of the frame for which rendering has occurred. In some examples, the machine learning is applied to, for instance, an accumulation buffer or other data structure that is modified based on the rendering that has taken place. In some embodiments, the accumulation buffer generated from previous frame(s) and the current frame are used. The machine learning may be achieved using a neural network such as a recurrent convolutional neural network (e.g. that considers current and previous frame(s)).

In some examples, the feature map corresponds to the tile of the image. Although there is no obligation for a single shader core to perform the rendering process and the machine learning process on the same tile, doing so is efficient since it obviates the need for the tile to be moved between shader cores, which uses bandwidth and energy.

In some examples, the machine learning process is a machine learning inference process. Machine learning processes can broadly be considered to correspond with 'learning' or 'training' in which a neural network is generated by an iterative learning process and 'inference' or 'implementation' in which the generated network is applied to the real world. In these examples, the machine learning process that is part of the complex rendering process is an inference process that makes use of an already generated neural network. For instance, this might involve the application of a kernel to an input (which could be a feature map such as an input feature map or output feature map) in order to generate an output, which could be an output feature map, an output image, or output data.

The term ML data covers input feature map, output feature map, output data, or output image, kernel weights, and kernel biases.

In some examples, the machine learning process performs temporal processing. This might, for instance, involve considering not just the current frame but also previous frames (or potentially even future frames) in order to perform the complex rendering process. For example, a machine learning process could be performed on a previous frame in order to generate a current frame, or training may have been performed in order to determine an adjustment that should be made between pairs of frames, and so on. In some examples, the machine learning process may take output from a previous frame or an accumulation buffer generated from a previous frames, and combine it with the current frame in order to generate an enhanced frame.

In some examples, the complex rendering process is an anti-aliasing process. Anti-aliasing reduces the jaggedness of pixels in an image. This can be achieved by a number of different techniques. For instance, supersampling is a technique in which an image is rendered at a higher resolution than desired. This increases the effective number of pixels in an image, which inherently allows for smoother lines and curves to be generated. Having generated the higher resolution image, the image is then downsampled to the desired resolution. This results in a degree of anti-aliasing such that pixels appear less jagged. However, generating frames at higher resolutions becomes computationally expensive—particularly when the result is simply downsampled. Some anti-aliasing techniques such as and deep learning anti-aliasing (DLAA) therefore make use of machine learning in order to improve the efficiency of the process. For instance, anti-aliasing could be performed at a higher, but not significantly higher resolution and then machine learning applied in order to approximate the downsampling from this resolution that would be achieved from a significantly higher resolution image. In this way, the same image improvement can be achieved with less computation required.

In some examples, the complex rendering process is a ray-tracing process. Ray-tracing is a technique used for light rendering (particularly in 3D rendering), which allows for more realistic rendering by modelling the light rays themselves. Since the only rays of light that are relevant in such a frame are those that strike the (virtual) camera, one can trace the rays of light backwards from the camera to the source(s). This process is very expensive. The more rays of light that are traced the more realistic the scene is likely to be (at least up to a point). However, each additional ray of light that is traced increases the complexity of the process. One technique is therefore to reduce the number of traces rays (e.g. preferably to one per pixel) and then to compensate for a small number of rays being traced by applying machine learning techniques. However, in tracing a smaller number of rays (which thereby reduces the computation requirement) the result is likely to be 'noisy'. It is therefore possible to perform a denoising process using machine learning in order to clean up the image. The specific type of ray-tracing process could therefore be a denoising ray-tracing process.

In some examples, the complex rendering process is a hybrid-ray-tracing process. Hybrid ray-tracing is a technique that uses both rasterization and ray-tracing to render an image. As hybrid ray-tracing makes use of rasterization and ray-tracing, at least one of the aforementioned techniques, machine learning temporal processing, machine learning anti-aliasing, machine learning upscaling/super resolution, machine learning denoising may be used by this rendering process.

It will be appreciated that the machine learning could be used for any image enhancement scheme. The machine learning techniques described herein could result in an image (or frame, or tile) or the same size or could produce an upscaled image (or frame, or tile). The machine learning may include temporal processing (e.g. using the current and previous frame) and/or spatial processing.

In some examples, the complex rendering process is a upscaling, or super resolution process, such as DLSS (Deep Learning Super Sampling). Rendering images at high resolution is computationally complex. One way to do this in a more efficient manner is by rendering images at a lower resolution, and then performing machine learning—either to perform scaling up to a higher resolution or after the image has been scaled to a higher resolution in order to clean it up.

In some examples, the complex rendering process performs the rendering process before performing the machine learning process. Note that this is not essential. In some examples, machine learning could be applied prior to the rendering so as to prepare the frame or tile for a rendering process that may proceed more quickly with the machine learning 'preparation' performed.

In some examples, the fragment data comprises an array of pixel values. The pixel values could be stored as an RGB tuple, for instance, with each member of the tuple indicating the level of red, green, or blue. A common way of doing this is to provide a 24-bit value with the first 8 bits being used to represent a level (i.e. a number between 0 and 255) of red, the second 8 bits being used to represent a level (i.e. a number between 0 and 255) of green, and the third 8 bits being used to represent a level (i.e. a number between 0 and 255) of blue. In some examples, colour depth per colour channel (red, green, blue) may be greater than or smaller than 8-bits. In some examples, the colour data may be stored in a floating-point format. In some examples, the pixels values could be stored as an RGBA tuple, the tuple indicating the level of red, green, blue or alpha. Where alpha indicates an alpha-blending level. The array can be a two-dimensional array representing X and Y coordinates of the tile.

In some examples, the tile of the image is less than 128×128 pixels. For instance, the tile might be 64×64 pixels, 32×32 pixels, or 16×16 pixels. Generally, tiles are square and each dimension is a power of two. Since the tiles are stored in the tile buffers, the size of the tiles dictates the size of the tile buffers. In particular, it is preferable for the tile buffers to hold a whole number of tiles so as to be efficient with storage. For instance, tile buffers might store exactly one tile each and therefore might have capacity equal to b×w×h where 'b' represents the number of bits used to store each pixel value, 'w' represents the number of pixels in a width direction of each tile, and 'h' represents the number of pixels in a height direction of each tile. Multiple tile buffers may be associated with a single shader core.

In some examples, the execution engine is configured to send a result of the complex rendering process for display. Having performed the complex rendering process, the result can then be written to a frame buffer in main memory. A display controller then fetches this data from the frame buffer and sends it to the panel for display. In some examples, the complex rendering process, performs a render-to-texture process, where the result can then be written to a buffer in main memory. The render-to-texture buffer may then be used as an input in a further rendering process.

In some examples, the result of the complex rendering process may then be post processed, for example, performing a bloom, chromatic aberration, vignette, depth of field, lens distortion, or motion blur effect on the result of the complex rendering process. The post processed result can then be written to a frame buffer in main memory. A display controller then fetches this data from the frame buffer and sends it to the panel for display.

In some examples, the feature map corresponds to the tile of the image; and the machine learning process is based on one or more neighbouring tiles of the tile.

In some examples, the apparatus is configured to determine whether at least part of a result of the complex rendering process will be required by an other apparatus; and in response to the determination being that the at least part of the result of the complex rendering process will be required by the other apparatus, the apparatus is configured to cause the at least part of the result of the complex rendering process to be preferentially stored in a cache.

In some examples, the apparatus is configured to communicate a status of the rendering process on the tile to a coherent area of memory.

In some examples, the apparatus is configured to obtain a status of the rendering process on the one or more neighbouring tiles of the tile from the coherent area of memory; and the apparatus is configured to evict the at least part of the result of the complex rendering process in dependence on the status of the rendering process on the one or more neighbouring tiles of the tile.

In some examples, the apparatus is configured to evict the at least part of the result of the complex rendering process when the status of the rendering process on the one or more neighbouring tiles indicates that the time to completion of the rendering process on the one or more neighbouring tiles is above a first threshold.

In some examples, the apparatus is configured to inhibit eviction of the at least part of the result of the complex rendering process when the status of the rendering process on the one or more neighbouring tiles indicates that the time to completion of the rendering process on the one or more neighbouring tiles is below or equal to the first threshold.

In some examples, the apparatus comprises: comparison circuitry configured to compare a hash of the feature map with a hash of a result of performing the complex rendering process data and to store the result back to the storage circuitry in dependence on the hash of the feature map and the hash of the result differing.

The following examples are also of relevance.

In accordance with one example configuration there is provided an apparatus configured to dispatch tasks to a plurality of processor circuits comprising: fetch circuitry configured to fetch or stream first neural network data from storage circuitry; broadcast circuitry configured to broadcast the first neural network data to at least a subset of the plurality of processor circuits; and dispatch circuitry configured to cause each of the at least a subset of the processor circuits to obtain second neural network data and to process its second neural network data with the first neural network data, wherein the second neural network data is different for each of the at least a subset of the processor circuits; and either the first neural network data is a kernel and the second neural network data is a feature map, or the first neural network data is the feature map and the second neural network data is the kernel.

In the above examples, one item of neural network data is sent to a plurality of processor circuits (at least a subset of all the processor circuits, which may include but need not be all of them). Each of the processor circuits that has been sent the first neural network data also obtains second neural network data. This is expected to be different for each of the processor circuits in question. Each processor circuit then performs processing using the first neural network data and the second neural network data. Since the first neural network data can be broadcast to the (at least a subset of) processing circuits, there is a reduction in resource consumption as opposed to a situation in which each processing circuit individually fetches the first neural network data and the second neural network data. Note that in some examples, the broadcast may comprise a plurality of kernels or a plurality of feature maps.

In some examples, the first neural network data is stored in an uncompressed form in the storage circuitry. In these examples, there is no need for further decompression to be performed on the first neural network data once it reaches the processor circuits. Consequently, energy is reduced as a consequence of a large number of processor circuits performing decompression on the same (first neural network) data.

In some examples, the storage circuitry is a cache. For instance, the cache might be a level three cache or a last level cache, or a level two cache. The cache may form part of a memory hierarchy together with at least a level one cache and a main memory backed, e.g. by DRAM.

In some examples, the apparatus comprises: decompress circuitry configured to decompress the first neural network data as it is stored into the storage circuitry, wherein the storage circuitry is a cache; and the fetch circuitry is configured to fetch or stream the first neural network data in a compressed form from a main memory. The decompress circuitry can be used in order to decompress the first neural network data when it is obtained from the main memory. The decompressed data can then be stored in the cache, which is fetched/streamed and then broadcast to the processor circuits. In this way, it is not necessary for each of the processor circuits to perform decompression on the same first neural network data. Instead, it can be performed once before being broadcast.

In some examples, the apparatus comprises: the storage circuitry, wherein the storage circuitry is configured to store, in association with each entry, an indication of whether that entry is to be broadcast by the broadcast circuitry. Each entry in the storage circuitry can be marked in order to indicate whether it should be broadcast to a plurality of the processor circuits or not. This can be used to differentiate it from other data in the storage circuitry that should be provided (or obtained) singly. It is therefore possible for the first neural network data marked in this manner to be proactively sent to the (at least a subset) of processor circuits, without each processor circuit having to individually request the first neural network data and thereby send it out as part of a broadcast.

In some examples, the apparatus comprises: the processor circuits, wherein the processor circuits are configured to store processed data, generated as a result of processing the second neural network data with the first neural network data, back to the storage circuitry. Having processed the first neural network data with the second neural network data, a result is produced. This result might initially be stored within local circuitry of the processor circuit that generated it (particularly if further processing is to be performed by that processor circuit), but ultimately is sent to the storage circuitry. By sending the data back to the storage circuitry (rather than directly to, for instance, another processor circuit), issues of coherency can be greatly simplified—the latest version of data is either stored in a specific, known processor circuit, or it is stored in the storage circuitry.

In some examples, the apparatus comprises: comparison circuitry configured to compare a hash of the feature map with a hash of the processed data and to store the processed data back to the storage circuitry in dependence on the hash of the feature map and the hash of the processed data differing. If the application of the first neural network to the second neural network does not provide new data (i.e. if the feature map is not changed as a result of the application of the kernel) then the act of writing the unchanged feature map back to the storage circuitry can be inhibited, thereby reducing bandwidth and energy consumption. In practice, this should have no effect on any computation, since the result remains the same. Furthermore, where writes involve compression, there is no need for the compression to be performed since the data remains unchanged. Note that in these examples, it may be necessary to assert the necessary signals to state that the write has been performed (even though it hasn't) in order to indicate that the processing has been performed.

In some examples, the apparatus is configured to operate in a kernel broadcast mode in which the first neural network data is a kernel and the second neural network data is a feature map; and the apparatus is configured to operate in a map broadcast mode in which the first neural network data is the feature map and the second neural network data is the kernel. In these examples, the apparatus is not limited to an either/or situation and can instead change between broadcasting the kernel and broadcasting the feature map.

In some examples, the apparatus is configured to dynamically change between the map broadcast mode and the kernel broadcast mode. The change between the map broadcast mode and the kernel broadcast mode can therefore happen, e.g. at runtime, and on demand.

In some examples, the apparatus is configured to dynamically change between the map broadcast mode and the kernel broadcast mode in dependence on a layer of neural network to which the kernel and the feature map relate. A neural network may be made up of a number of different layers. For instance, at a first layer, a first kernel may be applied to an input feature map to generate an output feature map, which becomes an input feature map to a second layer that applies a second kernel and generates a further output feature map that becomes the input feature map to a third layer and so on. As the layers are applied, the size of the input feature maps may grow or shrink. In addition, the number of kernels applied in each layer (e.g. to an input feature map), and the number of channels for each kernel might also change as the layers are applied. By broadcasting the largest of these (the kernel data or the feature map data) a greater saving of bandwidth and energy consumption can be made, as opposed to a situation where a larger number of transactions must occur. In some examples, a further consideration is whether and which of the kernel and feature map will fit into an internal memory of the processor circuits. In particular, prior to considering which of the feature map and the kernel is larger, the process might firstly rule out whichever of these is too large for the internal memory of the processor circuits. By storing the largest of the kernel and feature map that will fit into the internal memory of the processor circuits, it is possible to reduce the number of external memory accesses and therefore improve performance and energy consumption.

In some examples, the broadcast circuitry is configured to broadcast the first neural network data to at most a subset of the plurality of processor circuits; the broadcast circuitry is configured to broadcast third neural network data, different to the first neural network data, to a further subset of the plurality of processor circuits; the subset of the plurality of processor circuits and the further subset of the plurality of processor circuits are mutually exclusive; and the first neural network data and the third neural network data relate to different layers of a neural network. In these examples, different bits of neural network data are broadcast to different subsets of the processor circuits—with each processor circuit also acquiring its own second item of neural network data. This makes it possible, for instance, for different processor circuits to operate on different layers of the neural network simultaneously. In the case of convolution layers, deconvolution layers, and recurrent layers, all of which use spatially local processing, it is possible to pass a field that has been processed in one layer directly to the next layer as a 'pipeline' of processing where each processor circuit does processing for one of several layers and each of the processor circuits operate in parallel.

In some examples, the processor circuits are shader cores. Shader cores are processor circuits that are typically found in a Graphical Processing Unit (GPU). They are often capable of executing arbitrary programs (shaders) on inputs. The circuitry of such units, being intended for graphical processing, is particularly well suited to performing large numbers of mathematical operations in parallel. This therefore also happens to be well suited to performing machine learning (which also involves a large number of mathematical operations being performed).

In some examples, the broadcast circuitry is configured to broadcast the first neural network data to tile buffers in the at least a subset of the plurality of processor circuits. Tile buffers are small buffers sometimes found within shader cores (particularly those that support tile based deferred rendering) that are typically used to store a tile of graphical data (a small contiguous block of a frame—typically a two-dimensional block). Each shader core is typically configured to obtain a tile (e.g. from a tiler that splits the screen space primitives into tile regions), store that tile within the shader core's tile buffer(s), operate on the tile, and store the result back to the tile buffer(s), where it may be sent on to be pooled with the results from processing other tiles. The tile buffers are therefore suitable for holding neural network data (e.g. feature maps and/or kernels) and for storing the results. In some of these examples, the neural network data may be split across a plurality of shader cores found within a single shader core.

In some examples, the processor circuits are cores of a CPU. Each core may include its own local storage (e.g. a level one cache) and the neural network data can be stored within the local cache, operated on by the core, and then sent back to larger storage (such as a level two cache), e.g. with the results of other CPUs.

Particular embodiments will now be described with reference to the figures.

FIG. 1 illustrates an example data processing apparatus 100. The example shows a single shader core 110 (although several such devices might be present) connected to a bus 105. Each shader core 110 contains an execution engine 130 and one or more tile buffers 120. The tile buffers are generally responsible for holding data relating to a tile (a contiguous section of an image). For instance, each tile might hold 16×16 pixels, 32×32 pixels, 64×64 pixels, 128×128 pixels, or more generally, $2^n \times 2^m$ pixels (where n and m are positive integers, typically n and m are equal). The execution engine 130 is able to execute a number of "programs" or "shaders". As well as being able to perform general purpose computation, the execution engine 130 may contain a number of different specialised units. In this example, the shader core 130 is shown to contain a rasterizer 140, which takes vertex data and converts the vertex data into fragment data (i.e. that can be stored in the tile buffers 120), the fragment data is used to generate pixels in the frame buffer. A machine learning (ML) execution unit 137 specialises in (e.g. accelerates) machine learning operations (and therefore, for instance, might be well suited to perform matrix operations). In some cases, operations may be simultaneously performed in the execution engine 130 and the ML execution unit 137. In these situations, synchronisation may be required. Specifically, the state of each tile buffer 120 could be indicated using a signal or semaphore. A rendering process might only start if there is a free tile buffer 120 for the render output to be written. Machine learning processing might only start if a tile buffer 120 contains completed data for the machine learning to be operated on. Such synchronisation is not required where a single process operates on a single execution unit (e.g. on execution engine 130).

The shader core 110 also includes a compare circuit 195. These circuits are used to determine whether a write back operation to a cache 180, 187, 190 is necessitated or not, as will be discussed with reference to FIG. 10.

Also connected to the bus 105 is a tiler 150. The tiler 150 generates a tile list that indicates which primitives should be rendered for which tiles. Meanwhile, the job manager 135 generates fragment processing jobs for each tile, using the tile lists.

Collectively, the job manager 135, tiler 150, and shader core(s) 110 can make up a graphics processing unit (GPU) 175.

Parts of a memory hierarchy are also connected to the bus. For instance, this may include a main memory 160 (e.g. backed by DRAM) and one or more caches 180, 187, 190, which in this case include a level one cache 180 a level two cache 187, and a level three cache 190 that acts as a last level cache (LLC). A frame buffer 170 is also provided (in this case, as part of the main memory 160). After rasterization (and any other processing) is performed by the shader cores, the completed processed tiles are provided to the frame buffer 170 and sent on for display on a display unit. Note that the main memory 160 may be "off-chip" as compared to the other components and, typically, accesses to or communications with the main memory 160 are slower than accesses to or communications with other components.

The inventors of the present technique have realised that it is helpful for the execution engine 130 to be capable of performing 'complex rendering' in which a traditional rendering process (e.g. rasterization) is coupled with a machine learning process. To this end, a machine learning execution unit 137 is also provided within the shader core 110 (although machine learning can also be performed through other specialised units within the execution engine 130 or even through generic circuitry in the execution engine 130 itself, e.g. using software). Furthermore, the tile buffers 120 are used during the rendering process to perform traditional rendering while during the machine learning process, the tile buffers are used to store data relating to machine learning on the tile such as the weights associated with kernels or input feature maps. By keeping the data for a tile local, there is no need for the data to be transported to and from the shader core 110 and part of the memory hierarchy 160, 180, 190.

Also connected to the bus 105, in this example, is a central processing unit (CPU) 115. In this example, the CPU 115 hosts the driver 125, which generates data structures and programmes that are used by a GPU job manager 135, which in turn dispatches work to the shader cores 110, as will be described in more detail below in, for instance, FIG. 12.

Figure 2A:
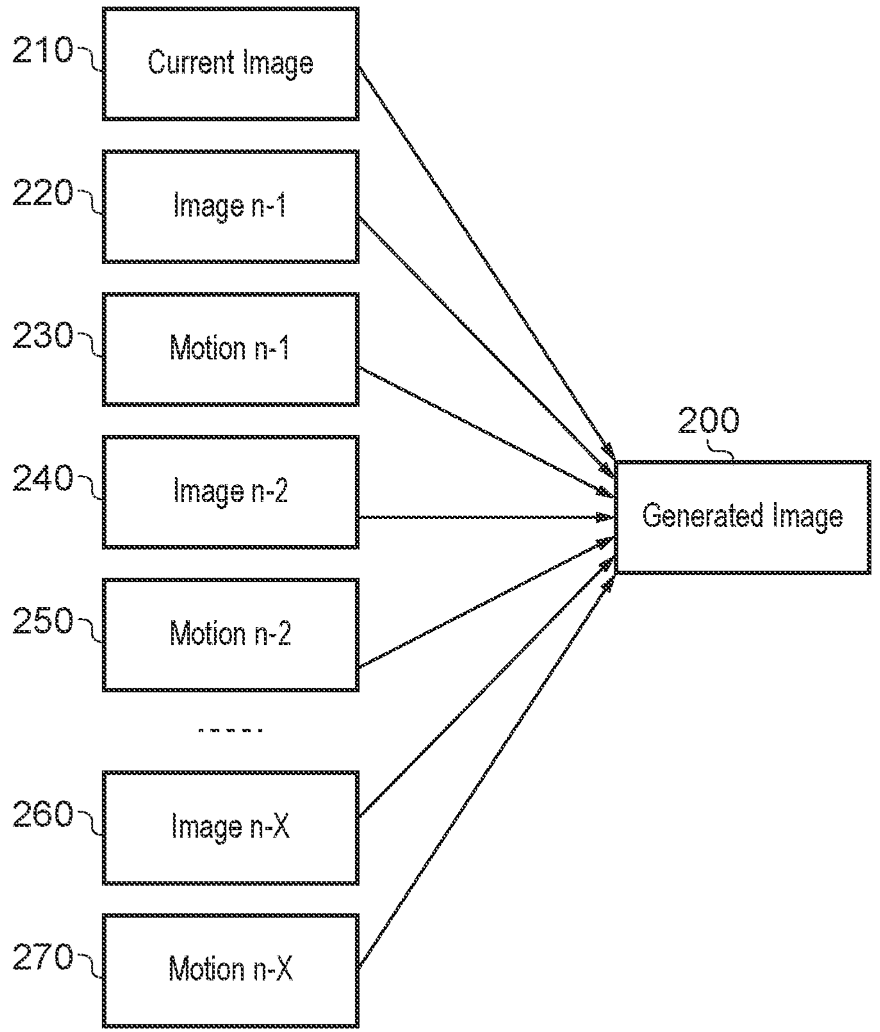
FIGS. 2A and 2B show an example of temporal processing.
Figure 2B:
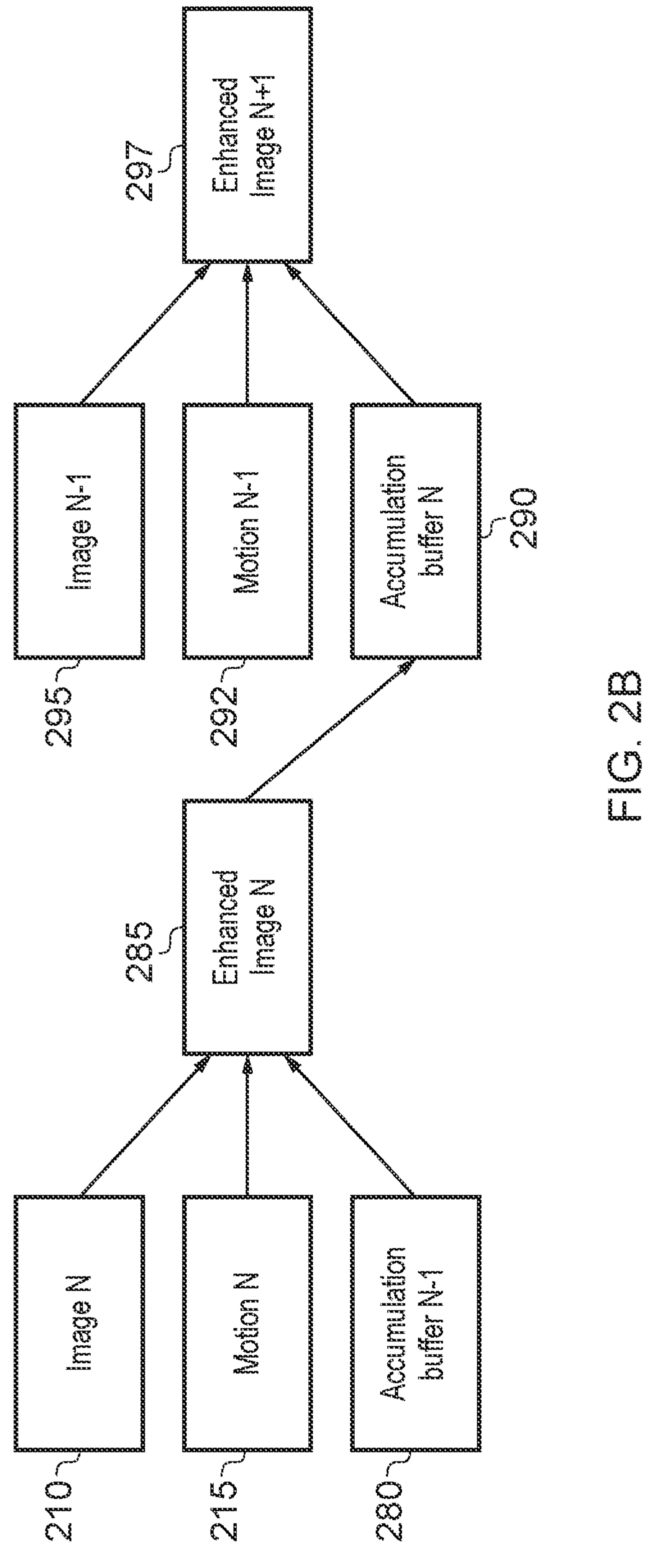

There are a number of types of complex rendering process that could be performed. However, in some examples, temporal processing is performed as illustrated in FIG. 2A. Here, the current image 210 (or tile of the image) and previous images 220, 240, 260 (or tiles of the images) as well as the motion 230, 250, 270 between those images/tiles are taken and combined in order to produce the generated image 200. The motion 230, 250, 270 between the images 220, 240, 260 could, for instance, be a series of motion vectors. The manner of combination depends on the specifics of the process being performed. In the embodiments shown in FIG. 2B, the previous frames are combined together to generate an accumulated frame, which is stored in an accumulation buffer 280. This accumulated frame (stored in the accumulation buffer 280) is used together with the newest image 210 and the motion 215 between that image 210 and its predecessor. This is used to generate an enhanced image 285. Having generated the enhanced image 285, it can be treated as the accumulated frame and written to the accumulation buffer 280 for another image and together with a new image 295 and the motion between the new image 295 and its predecessor 285, used to generate a still further enhanced image 297.

Spatial techniques can also be used. In these, nearby pixels are examined in order to see how they might affect the current pixel, in order to improve quality. Some of these schemes may use different filters depending on the nature of the region. For instance, if a region has an edge then a machine-learning based edge enhancement filter might be used whereas if the region is intended to be smooth then a machine-learning based interpolation filter may be used.

Figure 3:
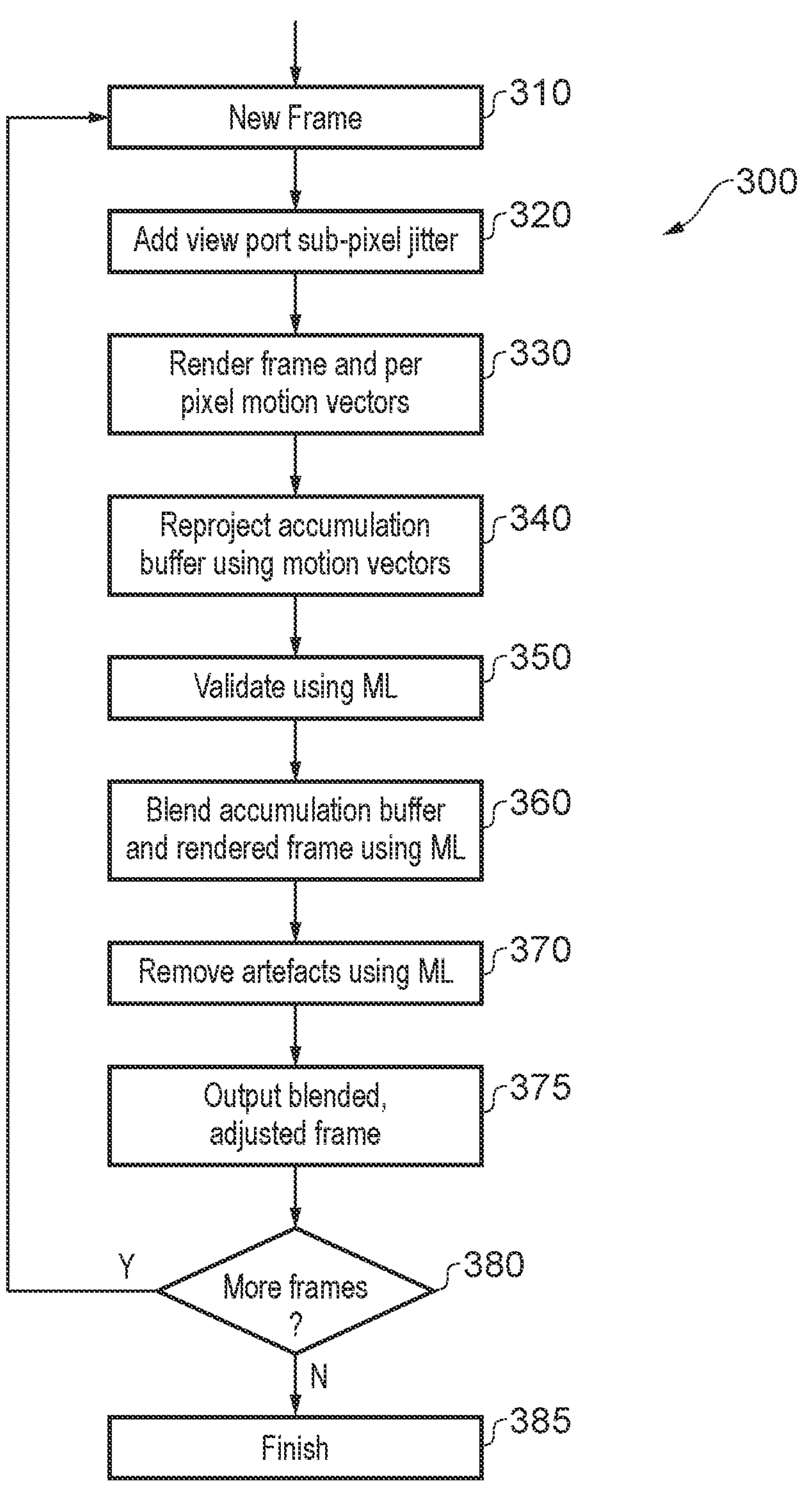
FIG. 3 shows a generalised example of using an accumulation buffer.

The use of such rendering techniques (such as spatial or temporal rendering), and particularly the use of an accumulation buffer 280 lends itself to machine learning techniques in order to improve the quality of the rendering process. A generalised example of this is illustrated in FIG. 3 in the form of a flowchart 300. The process begins at step 310 where a new frame is to be generated. At a step 320, sub-pixel jitter is added to the view port (virtual camera). This is done in order to add a small amount of random variety between successive frames in order to prevent a set of identical frames being generated (as might occur in the case of the virtual camera remaining still). At a step 330, the frame is rendered and motion vectors are determined for each pixel. This involves the frame being broken up into tiles by the tiler 150 and the tile buffers 120 of each core 110 being loaded with the tiles. A rasterizer 140 in each shader core 110 then performs the rendering process. At a step 340, the accumulation buffer 280 is re-projected using the calculated motion vectors. In other words, the accumulation buffer (which again may be provided in each shader core 110) is modified according to the latest frame that has been generated. At a step 350, validation is then performed, and this validation is a first opportunity at which machine learning can be applied. The validation step checks whether a blending of the accumulation buffer 280 and the rendered frame should take place. The validation process might consider whether a big change has occurred, which would lead to the blending having a bad effect. In the case of anti-aliasing, for instance, this might involve checking whether there is a significant difference in colour (or depth) between the pixels of the accumulation buffer and the current frame. In some situations, if the motion vectors are large, then the blending also may not occur. The machine learning model that is used can be trained to indicate whether and to what extent the blending process is likely to be successful based on previous training. In these examples, the machine learning process stores input feature maps or kernel weights in the tile buffers 120. Here, the input feature maps or kernel weights relate to the particular tile for which the validation is being performed.

At a step 360, the blending is performed to the extent indicated by the validation step 350. The blending process itself is a second opportunity at which machine learning can be applied. For instance, the strength or precise manner of blending could be controlled by AI based on a model that has been trained to determine the most appropriate form of blending to use. In general, it is difficult to tune an algorithm to correctly combine/blend pixels that move quickly. Performing the blending using machine learning can therefore perform the blending process more reliably. Such an algorithm might consider the motion vector (speeds) of pixels, the depth information and other image data, and combine them. Such techniques may also use an "awareness" of what is being represented. For instance, the knowledge that a particular tile is showing the texture for a wall may enable the tile to be processed more efficiently. At a step 370, a third opportunity for the application of machine learning is presented. Here, machine learning is applied in order to remove artefacts from the blended image. Again, a machine learning model may have been produced to recognise visual artefacts and to either highlight them to a user or to remove them from the image while minimising damage to the image itself. The blended frame is then output at step 375. At step 380, it is determined whether there are more frames to be processed. If not, then at step 385, the process finishes. Otherwise the process returns to step 310. Note that steps 350, 360, 370 could be performed by separate machine learning models or by a single combined model. Depending on the type of processing performed, the input to the model might be RGB image data, motion vectors, depth buffers, surface normal material types, and so on.

Note that although the above description refers to 'frames' it will be appreciated that each frame is actually broken down into a set of tiles by the tiler 150 and that the process described for each frame is actually performed in respect of the tiles of each frame. In each case, the machine learning process is achieved by placing the relevant input feature map and/or kernel weightings in the tile buffers 120.

Figure 4:
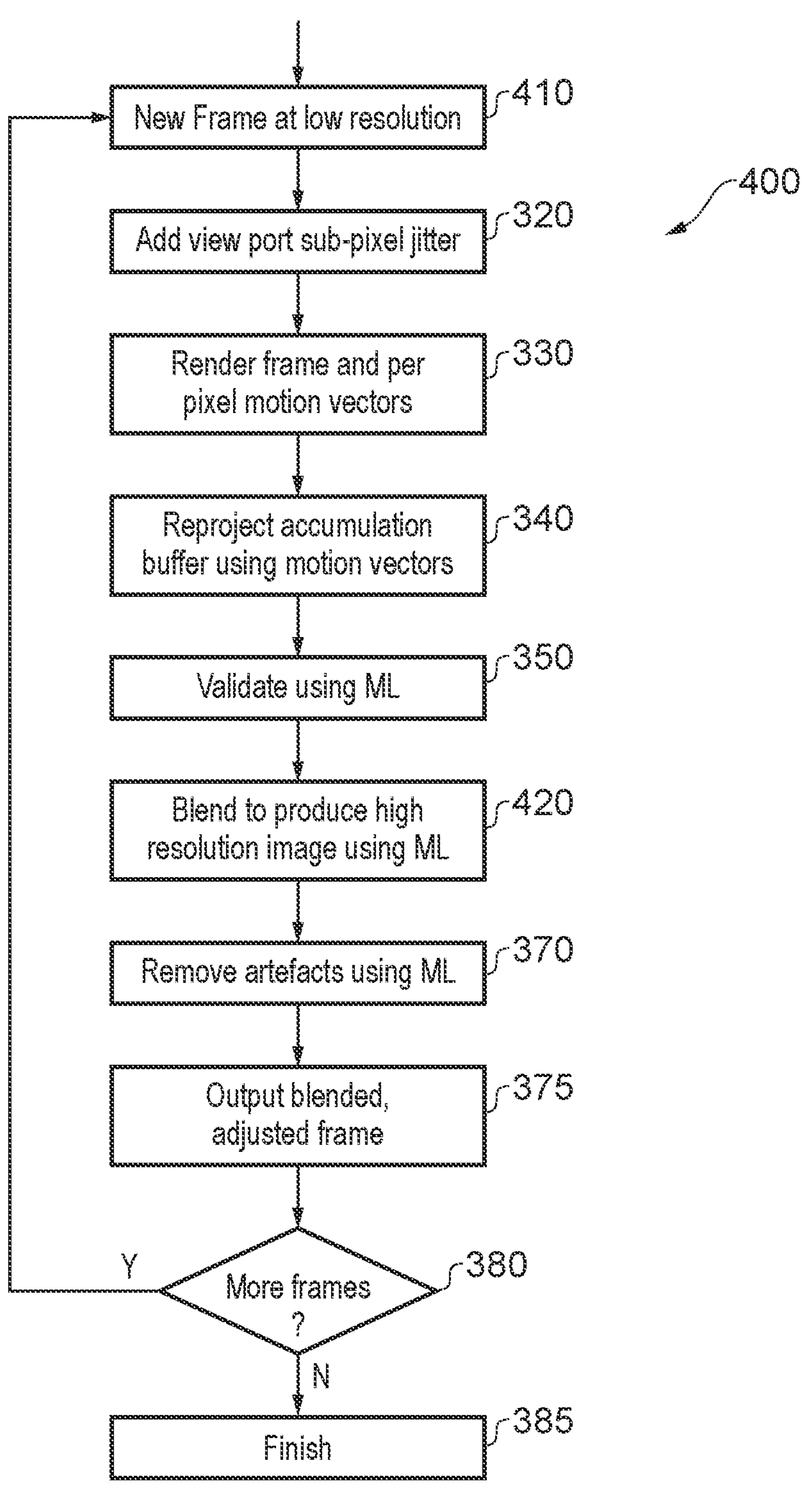
FIG. 4 shows a flowchart that shows an example of achieving super resolution.

FIG. 4 shows a more specific flowchart 400 that relates to super resolution. The process is largely the same as described with reference to the flowchart 300 of FIG. 3 and the same reference numerals are used for steps that are essentially unchanged. Of particular difference is that at a first step 410, the new frame is generated at a low resolution (specifically lower resolution than the super resolution image that is seeking to be generated). The other difference in this example is that after the validation step 350, the blending step 420 is performed in order to produce the high (super) resolution image. Again, during each of the machine learning steps, the tile buffers 120 are used to store input feature maps and/or kernel weights. In a first step of machine learning, the input feature map might correspond with the tile upon which machine learning is being used.

Machine learning based spatial techniques are also applicable to super resolution. For instance, https://beyondminds.ai/blog/an-introduction-to-super-resolution-using-deep-learning/describes a process in which the algorithm "understands" that an area or region (or tile) is, for instance, fur and so when processing and upscaling the area, it will correctly generate fur. https://towardsdatascience.com/single-image-super-ressolution-challenge-6f4835e5a156?gi=69c03777b0 also describes spatial techniques for super resolution.

Figure 5:
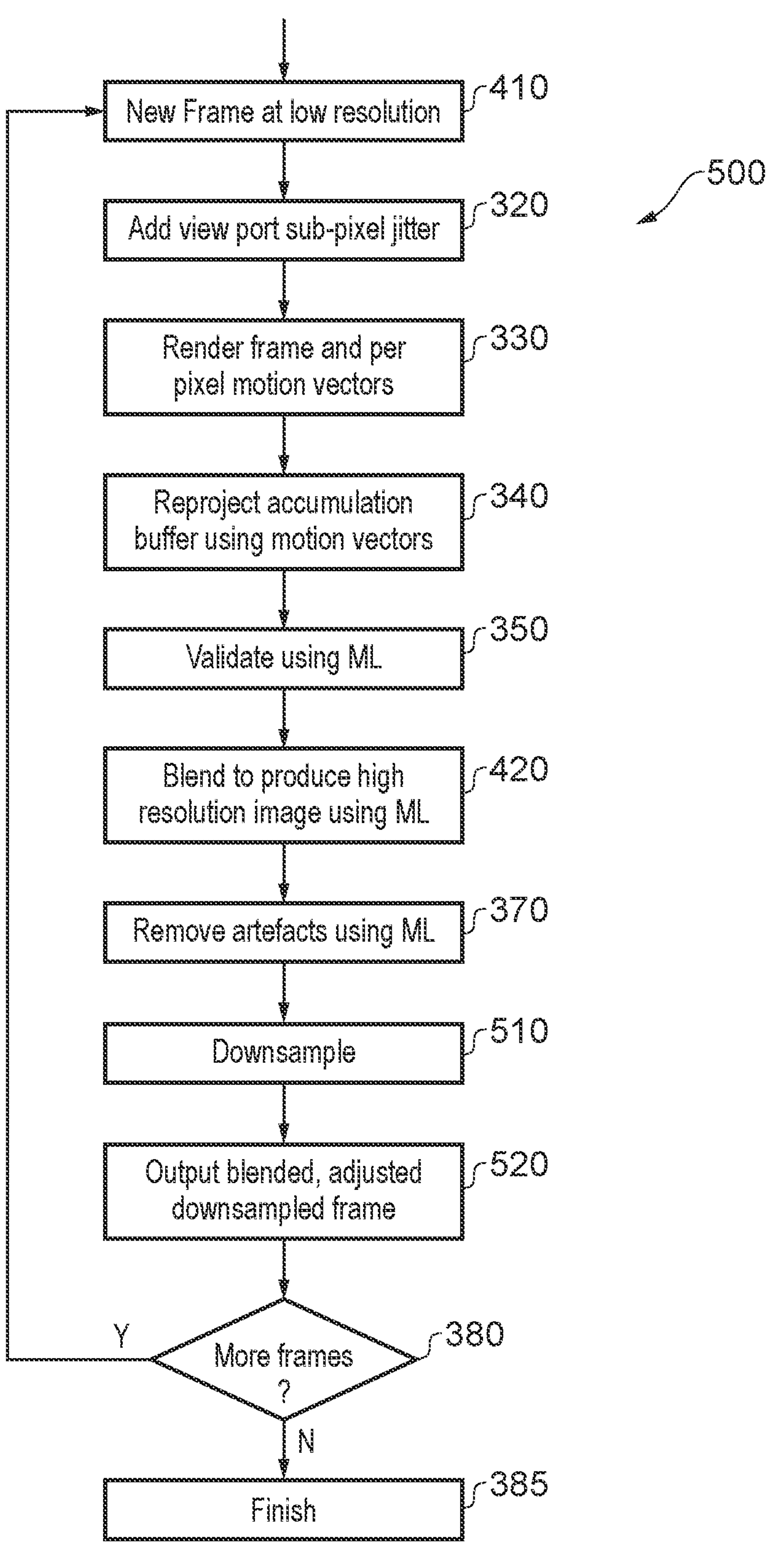
FIG. 5 shows a flowchart that shows an example of achieving anti-aliasing.

FIG. 5 shows a more specific flowchart 500 that relates to anti-aliasing. The process is largely the same as described with reference to the flowchart 300 of FIG. 3 and the flowchart 400 of FIG. 4 and the same reference numerals are used for steps that are essentially unchanged. The main difference in this process 500 is that after removing artefacts using machine learning at step 370, a downsampling step 510 is performed. This involves taking groups of adjoining pixels (such as those within a square) and calculating an average pixel value. The resulting average is then used as the pixel value in a downsampled image. Then, this downsampled image is output at step 520. As above, steps 350, 370, 420, and 510 could be performed using separate individual models or combined into fewer models (e.g. one model).

Figure 6:
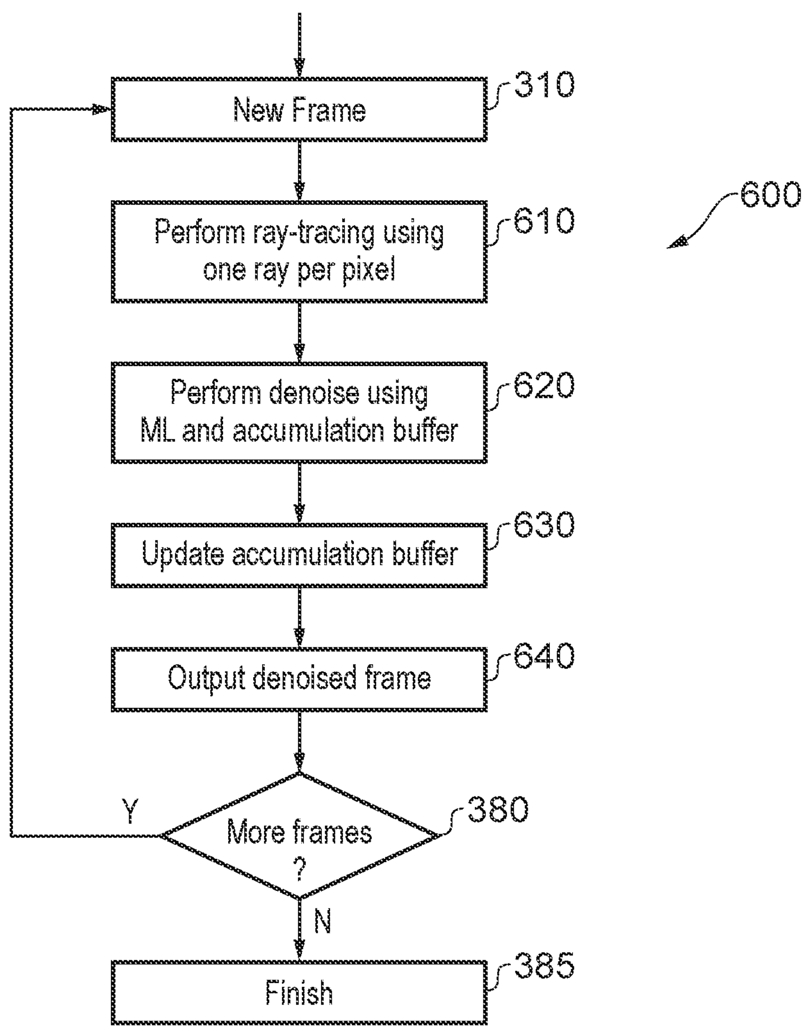
FIG. 6 shows a flowchart that shows an example of achieving ray-trace denoising.

FIG. 6 shows a flowchart 600 that relates to ray-trace, or hybrid-raytracing denoising. Note that the pixel jitter generation step 320 and the motion vector generation step 330 have been omitted for clarity, but may still be performed. As before, a new frame is generated at a step 310. Ray tracing is then performed at a low rate, such as one ray per pixel at a step 620. Then at step 620, a denoise process is performed using machine learning to combine the accumulation frame data (in the accumulation buffer) with the current frame to generate a new processed frame. The machine learning process might, for instance, be used to perform correction based on differences between the current frame and the accumulation buffer. For instance, the model that is used in the machine learning process might be usable to indicate those differences between the accumulation buffer and the current frame that constitute noise and potentially how the noise should be eliminated. In any case, the accumulation buffer is updated at step 630 to take into account the new processed frame and the (now denoised) new processed frame is output at step 640. At a step 380, it is determined whether there are more frames to be processed and if so, the process returns to step 310. Otherwise, the process ends at step 385.

In this example, as with the previous examples, the tile buffers 120 store input feature maps or kernel weights during the machine learning process and store fragments (e.g. pixels) during the rendering process.

Figure 7:
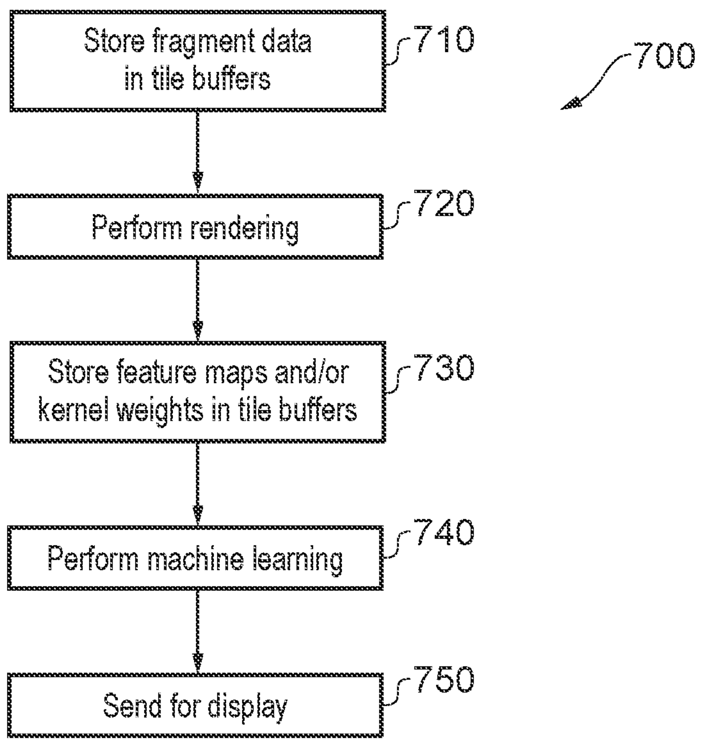
FIG. 7 shows a flowchart that illustrates a process for complex rendering.

FIG. 7 shows a flowchart 700 that illustrates a process for complex rendering. The rendering process waits for one or more tile buffer to become available. At step 710 the rendering process then allocates the one or more tile buffer. At a step 720, rendered fragment data (e.g. pixels or vector data), from the rendering process, for a tile are stored in the one or more tile buffers 120. In an example, the machine learning process may require further buffers, if so, the machine learning process waits for one or more tile buffers to become available, and the machine learning process then allocates the one or more tile buffer. At a step 730, the machine learning process then allocates the one or more tile buffers and fetches the feature maps and/or kernel weights, where these feature maps and/or kernel weight are stored in the tile buffers 120. In some examples, the feature maps relate to the same tile for which the rendering was performed. In some examples, the input to the machine learning process is the rendered fragment data (e.g. pixels or vector data), from the rendering process. A machine learning process is then performed at step 740. In some examples, the machine learning process may write the intermediate output feature map results to cache or main memory and may fetch further input feature map that are stored in the allocated tile buffers. In some examples, the machine learning process may fetch further kernel weights that are stored in the allocated tile buffers 120. Finally, the finished tile is then sent for display at step 750. In some examples the finished tile is sent to a storage circuit, for example main memory. The machine learning process then deallocates tiles allocated by the rendering process and the machine learning process.

In some examples the rendering process and the machine learning process are the same combined rendering and machine learning process, in this case the sequence shown by flowchart 700 is as follows. The combined rendering and machine learning process waits for one or more tile buffer to become available. At step 710 the combined rendering and machine learning process then allocates the one or more tile buffer. At a step 720, rendered fragment data (e.g. pixels or vector data), from the combined rendering and machine learning process, for a tile are stored in the one or more tile buffers 120. At a step 730, the combined rendering and machine learning process then fetch the feature maps and/or kernel weights, these feature maps and/or kernels weights are stored in the tile buffers 120. In some examples, the feature maps relate to the same tile for which the rendering was performed. In some examples, the machine learning input is the rendered fragment data (e.g. pixels or vector data). A machine learning process is then performed at step 740. In some examples, the combined rendering and machine learning process may write the intermediate output feature map results to cache or main memory and may fetch further input feature map that are stored in the allocated tile buffers. In some examples, the combined rendering and machine learning process may fetch further kernel weights that are stored in the allocated tile buffers 120. Finally, the finished tile is then sent for display at step 750. In some examples the finished tile is sent to a storage circuit, for example main memory. The combined rendering and machine learning process then deallocates tiles allocated by the combined rendering and machine learning process.

By using the tile buffers 120 to perform both the rendering process and the machine learning process, it is possible to take advantage of complex rendering processes that use both traditional rendering and machine learning, without the tile data being transferred to and from the tile buffers 120. This is particularly beneficial if compression/decompression is performed for data entering and/or leaving the tile buffers 120.

Figure 8:
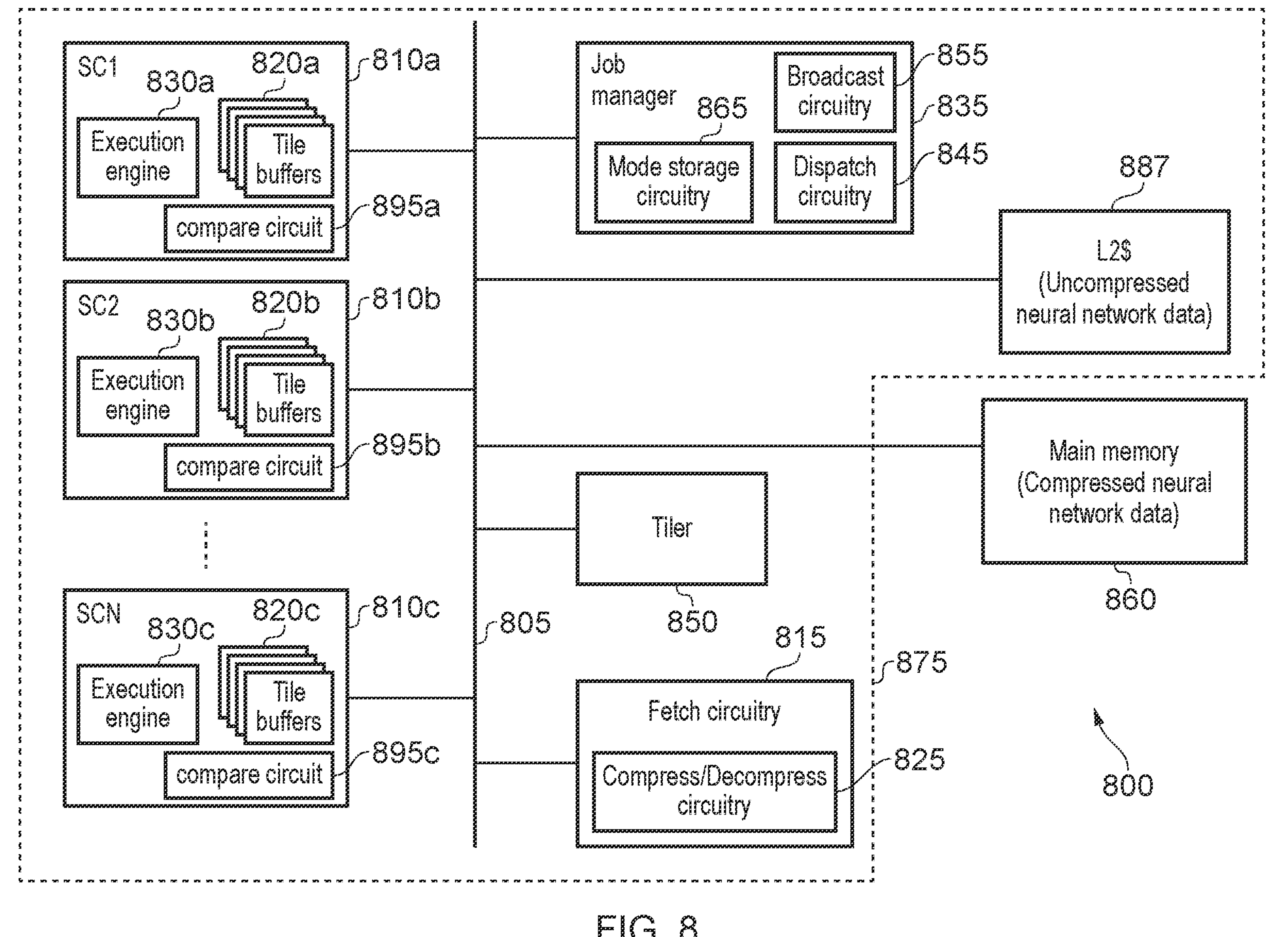
FIG. 8 schematically shows an apparatus.

FIG. 8 shows an apparatus 800. The apparatus 800 might be the same apparatus as illustrated with respect to FIG. 1 and elements with the same name perform substantially the same function as already described. However, FIG. 8 is provided to focus on a different aspect that can be achieved with the same (or similar) system. The apparatus includes a Graphics Processing Unit (GPU) 875. The GPU 875 includes a number of shader cores (SC1, SC2, . . . SCN) 810*a*, 810*b*, 810*c*. Each shader core includes an execution engine 830*a*, 830*b*, 830*c*, which is responsible for executing small programs (shaders) on input data, together with a set of tile buffers 820*a*, 820*b*, 820*c*. In graphics processing tasks, the tile buffers are responsible for storing a tile, which is a contiguous 2D area of a frame, and which is to be processed by the shader running on the execution engine 830*a*, 830*b*, 830*c*. The tile buffers might have a storage capacity of, for instance, 1 kB and four tile buffers 820*a* might be provided for each core 810*a* for a total storage of 4 kB per shader core 810*a*.

A tiler 850 is provided in order to separate a frame into a number of tiles. These are then sent to the shader cores 810*a*, 810*b*, 810*c* by the job manager 835.

The present examples provide an efficient way of enabling neural network data to be processed using the shader cores 810*a*, 810*b*, 810*c*. Since the shader cores are well suited to performing large amounts of parallelised mathematical processing for graphical tasks, they are also well suited to machine learning operations (which typically involve matrix operations).

The job manager 835 determines a next machine learning operation to be performed and determines which data is required for the operation to be performed. This is performed as part of a work dispatch process, which will be described in more detail below in, for instance, FIG. 12. Fetch circuitry 815 is provided to obtain neural network data from a main memory 860, which might be backed by a DRAM. During this process, the data from the main memory 860 might need to be decompressed by compress/decompress circuitry 825. The data can then be stored into local storage circuitry (e.g. a level two cache 887) in decompressed form.

The job manager 835 then selects a set of the shader cores 810*a*, 810*b*, 810*c* with which to perform the processing for the machine learning operation. Machine learning operations typically comprise a number of layers. At each layer a kernel, which is a part of a model that has been trained for performing the operation, is applied to an input feature map in order to produce an output feature map (OFM). The output feature map of one layer then becomes an input feature map to the next layer. The kernel at each layer is unmodified by the processing operation. The machine learning operation performed by the execution engine 830*a*, 830*b*, 830*c* therefore requires a kernel and a feature map to operate. Typically, however, one of these items of neural network data (the kernel or the feature map) will be used by all of the selected shader cores and therefore remains 'stationary' while the other item of neural network data (the feature map or the kernel) will be specific to each shader core. The fetch circuitry 815 is used to fetch the neural network data from the level two cache 887. Broadcast circuitry 855 is then used to broadcast the neural network data that is common to the selected shader cores 810*a*, 810*b*, 810*c* while the neural network data that is specific to each individual shader core 810*a*, 810*b*, 810*c* is individually provided using dispatch circuitry 845.

Note that since the data has already been decompressed when it is stored into the level two cache 887, there is no need for the common neural network data to be repeatedly fetched from main memory 860, nor repeatedly decompressed, nor repeatedly transmitted to the shader cores 810*a*, 810*b*, 810*c* and thus bandwidth and energy consumption are reduced.

In some cases, a plurality of different machine learning operations might be performed (e.g. operating on different layers of a neural network) in which case one subset of the shader cores 810*a*, 810*b* might operate on one set of data and a second subset of the shader cores 810*c* might operate on another set of data. In these cases, multiple broadcasts (or multicasts) might be made by the broadcast circuitry 855, each to a different subset of the shader cores 810*a*, 810*b*, 810*c*.

Each of the shader cores 810*a*, 810*b*, 810*c* also contains compare circuitry 895*a*, 895*b*, 895*c*. These circuits are used to determine whether a write back operation to the cache 887 is necessitated or not, as will be discussed with reference to FIG. 10.

Figure 9:
FIG. 9 illustrates an example of the level two cache.

FIG. 9 illustrates an example of the level two cache 887. The structure of the level two cache 887 includes a tag field 910, which is used to index individual entries of the cache structure so that they can be located, and a data field 920, which contains the actual data of interest. For each entry, a validity flag 930, dirty flag 940, and broadcast flag 950 is provided. The validity flag 930 is used to indicate whether a particular entry is valid and should therefore be used or not. The dirty flag 940 is used to indicate whether the entry has been modified since being acquired from main memory 860 (where the 'official' copy of the data resides). Finally, the broadcast flag 950 is used to indicate whether the data should be broadcast by the broadcast circuitry 855 when it is sent out, or unicast by the dispatch circuitry 845 when it is sent out. This is determined by the job manager 835 when the data is fetched from the main memory 860 into the cache 887 depending on the nature of the machine learning operation to be performed.

Note that in this example, a simple 'broadcast' flag is provided, which indicates whether the data in the data field 920 should be broadcast to all of the shader cores 810*a*, 810*b*, 810*c* or not. In other embodiments, the cache may replace the broadcast flag 950 with a mask to indicate which of the shader cores 810*a*, 810*b*, 810*c* the data in the data field 920 should be multicast/broadcast to. The broadcast flag 950 (or alternatively the mask) can also be used to differentiate the broadcastable data from other data that might be present in the cache 887. In particular, this can be used to inhibit or prevent data that is intended to be broadcast to the processing units from being pulled into instruction caches or other data caches and can enable the data to instead be directed towards the tile buffers 820*a*, 820*b*, 820*c* of the relevant shader cores 810*a*, 810*b*, 810*c* (for instance).

Often in such a system, a feature map may move through a number of layers of a neural network, with each processing circuit (e.g. shader core) continually operating with the same kernel (i.e. performing processing for the same layer). A feature map may therefore move between the processing circuits (e.g. shader cores) as it progresses through the neural network layers. Ordinarily, this would require an element of coherency control so that the data can be tracked through the shader cores. However, the deterministic nature of machine learning processes means that extensive coherency control is not necessary.

Figure 10:
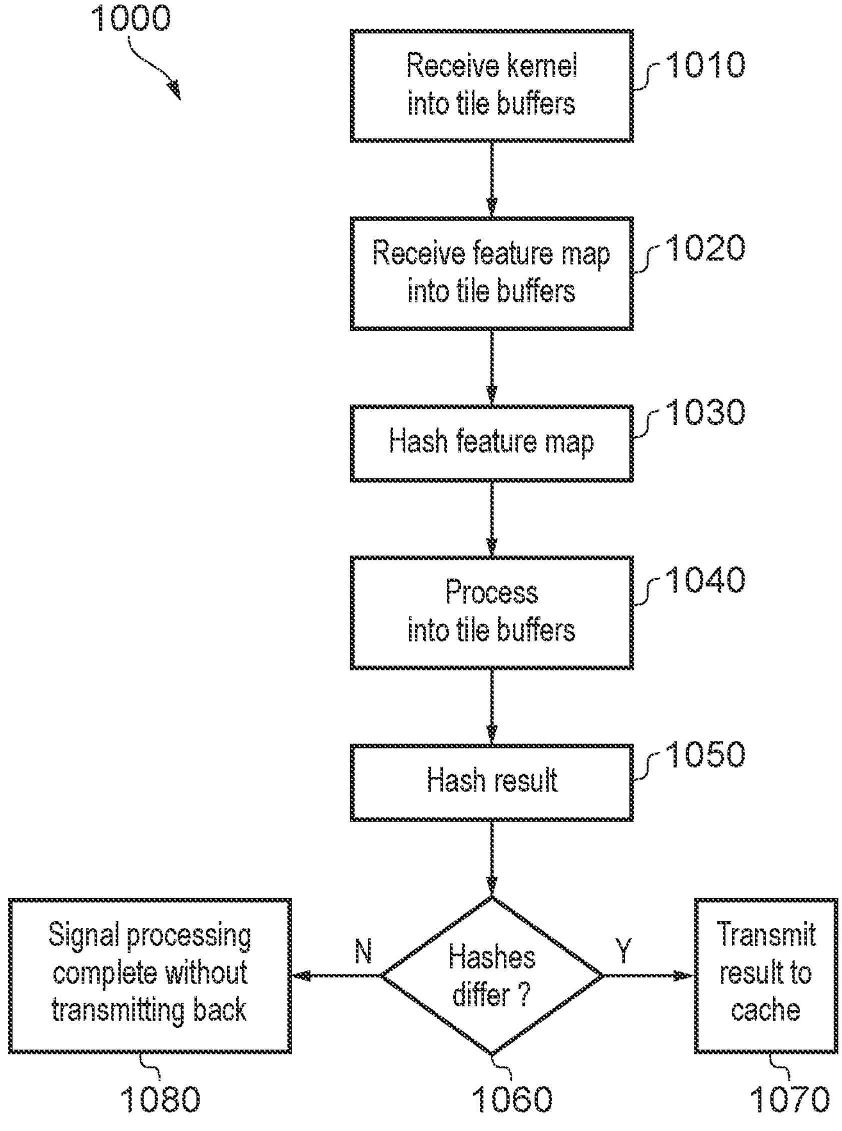
FIG. 10 illustrates a flowchart that shows an alternative process to reduce the extent to which unnecessary bandwidth consumption occurs.

FIG. 10 illustrates a flowchart 1000 that shows an alternative process to reduce the extent to which unnecessary bandwidth consumption occurs. The process may be performed, for instance, via a single shader core. At a step 1010, the kernel is received into tile buffers 120/820*a* of the shader core 110/810*a*. At a step 1020, the feature map is received into the tile buffers 120/820*a* of the shader core 110/810*a*. It will be appreciated that these two steps could, of course, be inverted. At a step 1030, a hash of the feature map is carried out and temporarily stored. The exact hashing algorithm (for example, CRC32 or MD5) that is used is not especially important but should be such that even small changes to the input will produce changes to the hash that is generated. At a step 1040, processing is performed using the kernel and the feature map in order to produce, for instance, an output feature map. This output feature map is initially stored within the tile buffers 120/820*a* of the shader core 110/810*a*. At a step 1050, the result (the output feature map) is hashed using the same hash algorithm used in step 1030. The two hashes are then compared to each other at step 1060, e.g. using compare circuitry 195/895*a*. If the two hashes differ from each other then at step 1070, the result (the output feature map) is transmitted back to a cache 187/887 (or to a next level of the memory system). Otherwise, at step 1080, the processing is signalled as complete (e.g. via the job manager 835) and either that no update needed to be provided or that the cache 187/887 (already) contains the latest version of the result.

The result of processing performed at one shader core 810*a* might be transmitted directly to another core 110/810*b*. However, the data is more commonly transmitted to a cache 187/887 and from there, the data can be transmitted to the next shader core 810*b* as dictated by the job manager 835, for instance. In this way, the latest data can be stored in the cache 187/887 or can be stored in a single, known, specific shader core 110/810*a* at any particular instance.

Separately to this, the comparison of 'before' and 'after' hashes makes it possible to determine whether the feature map has changed as a result of the processing that has been performed (i.e. whether the input feature map is identical to the output feature map). If the hashes are identical, then it might be expected that no change to the feature map has been made and so there is no need to expend bandwidth or energy in transmitting the same data back to the cache 187/887.

Figure 11A:
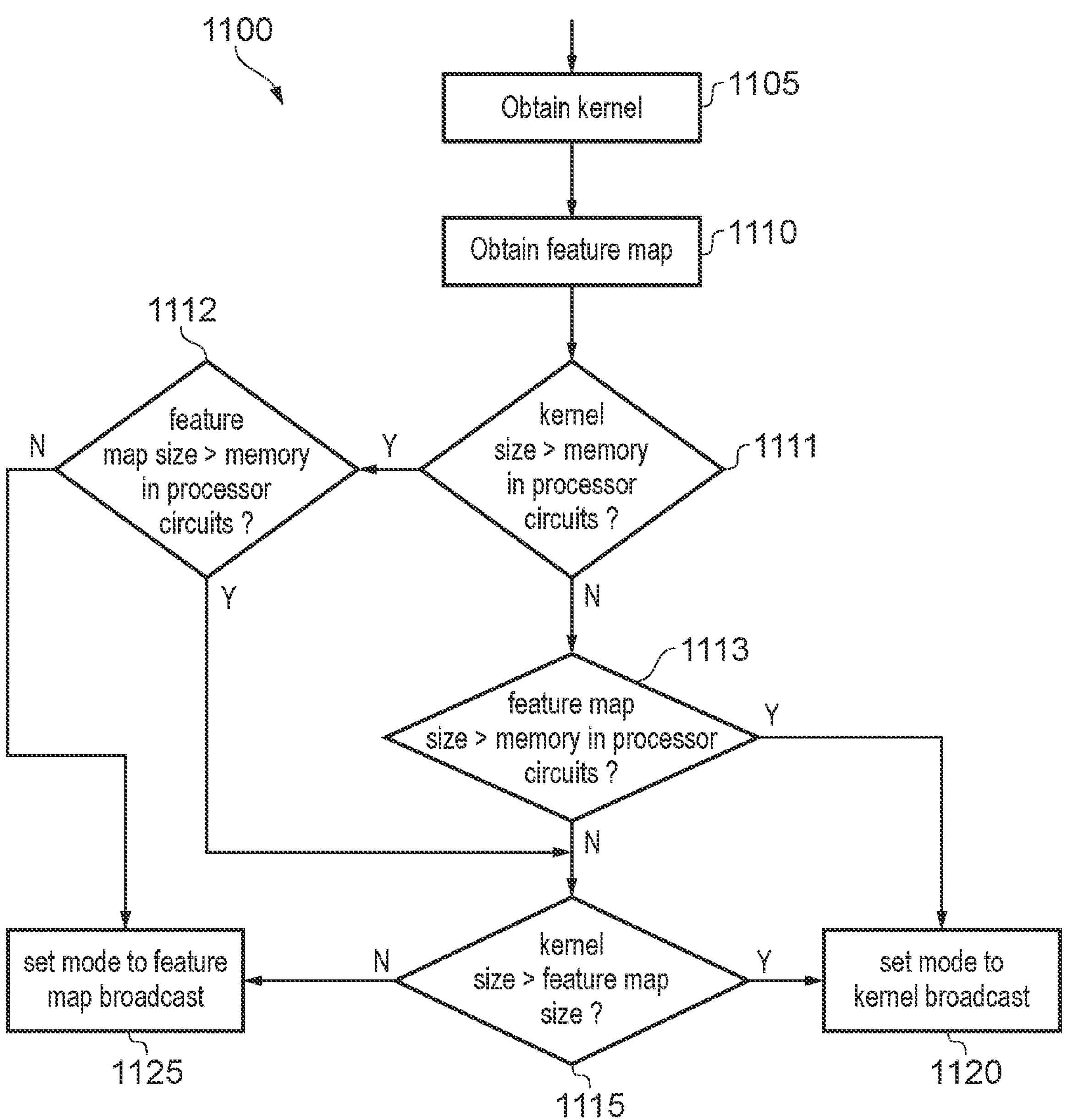
FIGS. 11A and 11B collectively show how the operational mode (broadcast kernel mode vs feature map broadcast mode) can be dynamically changed at runtime.
Figure 11B:
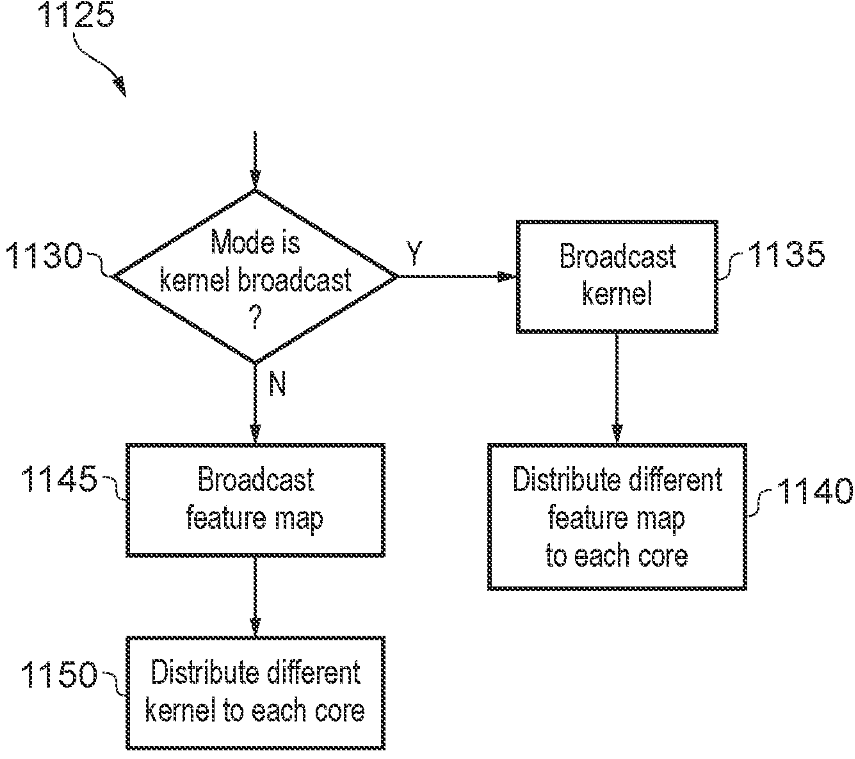

FIGS. 11A and 11B collectively show how the operational mode (broadcast kernel mode vs feature map broadcast mode) can be dynamically changed at runtime and how the selection of mode can be used to reduce the bandwidth consumption within the system. It particular, it will be appreciated that parallelism can be achieved either by keeping the kernel(s) constant/stationary across all of the shader cores 810*a*, 810*b*, 810*c* and having each of the shader cores 810*a*, 810*b*, 810*c* operate on a different feature map, or by having the feature map remain constant/stationary across all of the shader cores 810*a*, 810*b*, 810*c* and applying different kernel(s) to each of those feature maps. In each case, each of the shader cores 810*a*, 810*b*, 810*c* produces a part of the output feature map. So for example, if letters A, B, C, D represent feature maps and letters w, x, y, z represent kernels and numbers 1, 2, 3, 4 represent processor cores then one assignment of kernels to processor cores would be:

1: w
2: x
3: y
4: z

Then, the feature maps A, B, C, D could be broadcast one at a time to each of the four processor cores (1-4). Alternatively, the feature maps could be assigned to the processor cores:

1: A
2: B
3: C
4: D

Then, the kernels w, x, y, z could be broadcast one at a time to each of the four processor cores (1-4).

Of course, in some examples, depending on the sizes, the broadcast might include multiple data elements (e.g. multiple kernels or multiple feature maps), which could be split at the cores and processed one after another. Although the above examples refer to keeping an entire IFM or kernel constant, it could be a portion of an IFM or kernel that is kept constant, if only a portion of the IFM or kernel will fit within the storage of the shader cores 810*a*, 810*b*, 810*c*.

The question of whether the kernel(s) or the feature map(s) should be broadcast is at least partly dependent on which of the two sets of data is the largest. This might change as layers are successively applied. For instance, consider a neural network consisting of three layers that operate as follows:

| | Layer 1 | Layer 2 | Layer 3 |
|---|---|---|---|
| Height | 224 | 112 | 56 |
| Width | 224 | 112 | 56 |
| Channels | 3 | 256 | 256 |
| Kernels | 256 | 256 | 512 |

That is to say that in the first layer, for instance, the height and width of the feature map is 224×224, and that 256 kernels are applied to the feature map. Meanwhile, there are three channels, which might represent the number of elements of data (e.g. red, green, and blue values for pixels) or could represent the number of different feature maps to which the present layer is to be applied (which might depend on the number of output feature maps generated by a previous layer). In a second layer, the height and the width of the feature map has decreased to 112×112 (e.g. via pooling from the previous layer). The number of channels has increased to 256, and the number of kernels remains at 256.

The data size for the input feature map(s) is dependent on the height and width of the feature maps as well as the number of channels (namely height*width*channels) and therefore differs by each layer as follows:

| | Layer 1 | Layer 2 | Layer 3 |
|---|---|---|---|
| Height | 224 | 112 | 56 |
| Width | 224 | 112 | 56 |
| Channels | 3 | 256 | 256 |
| Total IFM(s) size | 150528 | 3211264 | 802816 |

Meanwhile, the data size for the kernel(s) is dependent on the height and width of the kernels, as well as the number of channels, and the number of kernels to be applied (namely height*width*channels*kernels) and therefore differs by each layer as follows:

| | Layer 1 | Layer 2 | Layer 3 |
|---|---|---|---|
| Height | 3 | 3 | 3 |
| Width | 3 | 3 | 3 |

-continued

| | Layer 1 | Layer 2 | Layer 3 |
|---|---|---|---|
| Channels | 3 | 256 | 256 |
| Kernels | 256 | 256 | 512 |
| Total kernel(s) size | 6912 | 589824 | 1179648 |

Note that the kernel height and width remain the same in each layer, but the number of channels and the number of kernels increases across the layers. Thus it can be seen that in the first layer, the IFM data is larger, and similarly in the second layer. But for the third layer, the kernel data is larger and so (other factors notwithstanding, as will be discussed below) it would be preferable to broadcast the larger kernel data to reduce the number of large transmissions being made.

FIG. 11A shows, in the form of a flowchart 1100, how the mode can be changed. At a step 1105, the kernel to be processed is fetched by the job manager 835 for the next machine learning job to be performed. At a step 1110, the feature map to be processed is also obtained. At a step 1111, it is determined whether the kernel size is bigger than an internal memory size of the processor circuits. If not then at step 1113, it is determined whether the feature map size is greater than a size of the internal memory of the processor circuits at step 1113. If not, then neither the kernel nor the feature maps are too large for the internal memory of the processor circuits and so at step 1115, it is determined whether the kernel size is bigger than the feature map size. If so, then the mode is set to kernel broadcast mode at step 1120 and otherwise, the mode is set to feature map broadcast at step 1125 in order to reduce the number of memory accesses.

If, at step 1113, the feature map size is bigger than the memory size of the processor circuits, then the process proceeds straight to step 1120. This is because there is less value in broadcasting something that is too large for the internal memory of the processor circuits, since this would necessitate multiple broadcasts.

If, at step 1111, the kernel size is bigger than the memory size of the processor circuits, then the process proceeds to step 1112 where the size of the feature map is considered. If the feature map is not larger the size of the memory in the processor circuits then the reverse situation applies and so the mode is set to feature map broadcast mode in step 1125 in order to reduce the number of broadcasts taking place.

Finally, if at step 1112 the feature map size is larger than the memory size of the processor circuits then neither the kernel nor the feature map can fit within the internal memory of the processor circuits. In this case, the process proceeds to step 1115 where the largest of these items is broadcast.

This can be explained mathematically. Consider that the feature map is 1024 KB and the kernel is 256 KB and the internal memory of each processor circuit is 256 KB. A first option is to broadcast the kernel into the internal memory and stream the feature map to each of the k processor circuits. The total data transfer (in KB) for this would be 256+1024 k. A second option is to broadcast one quarter of the feature map to each of the k processor circuits and to stream the kernel to each of the k processor circuits, and to repeat this process four times (1024/256=4). The total data transfer (in KB) for this would be (256+256 k)*4=1024+1024 k. It is therefore preferable, in general, to primarily store whichever of the feature map or kernel will actually fit in the internal memory of the processor circuits. If either will fit, then the selecting the largest to be stored should reduce the data transmission.

The mode is therefore set in order to cause the broadcast to occur in respect of whichever of the kernel and the feature map is larger that will fit within the memory of the processor circuit. This therefore reduces the amount of data transmitted (e.g. over the bus 805) by causing a single broadcast to occur in respect of the larger data structure while allowing a smaller number of individual transmissions to occur in respect of the smaller data structure.

FIG. 11B shows, in the form of another flowchart 1125, how the set mode can be used to dictate what gets transmitted. In particular, at a step 1130, it is determined whether the current mode is 'kernel broadcast' (as opposed to 'feature map broadcast'). If the mode is 'kernel broadcast' then at step 1135, the kernel is broadcast to the relevant shader cores 810*a*, 810*b*, 810*c*. Then, a different feature map is distributed to the shader cores 810*a*, 810*b*, 810*c* at step 1140. Otherwise, at a step 1145, the feature map is broadcast to the relevant shader cores 810*a*, 810*b*, 810*c*. Then, at a step 1150, a different kernel is distributed to the shader cores 810*a*, 810*b*, 810*c*.

The above description makes particular reference to shader cores 810*a*, 810*b*, 810*c*. However, it will be appreciated that the present techniques are equally applicable to processor cores making up a CPU. In such embodiments, the job manager 835 may take the form of one of the processor cores themselves. The execution engine 830*a*, 830*b*, 830*c* of each core could constitute a pipeline or single execution unit and the tile buffers could take the form of level one caches (assuming each level one cache is specific to the core).

Figure 12:
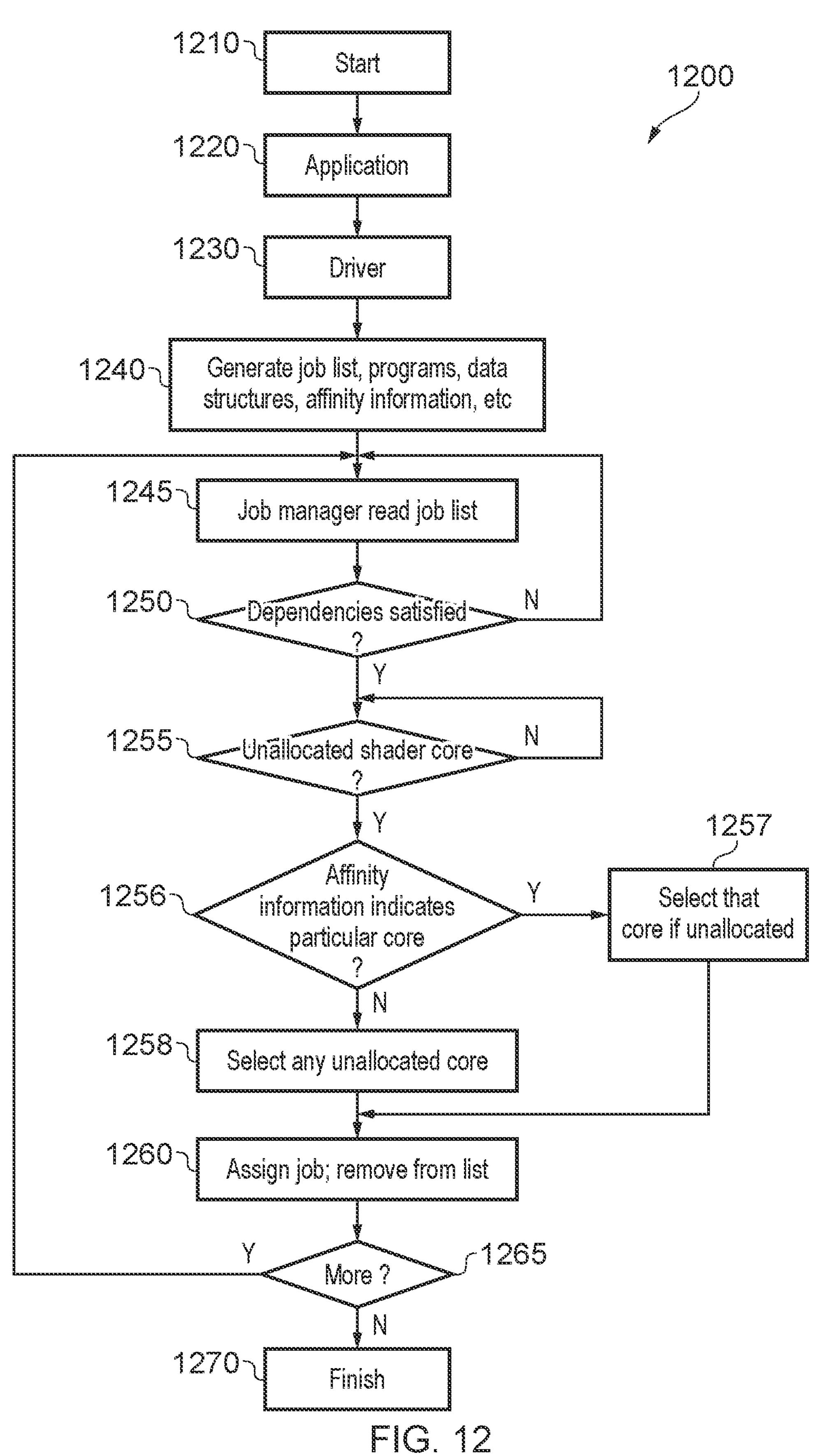
FIG. 12 illustrates, in the form of a flowchart, an example of the work dispatch process.

The work dispatch process for the above examples will now be described with reference to the flowchart of FIG. 12.

The process begins at step 1210. At a step 1220, an underlying application (that may execute on a CPU 115 for instance) executes a process that involves graphics and/or machine learning tasks. Where a process involves both graphics and machine learning, this might be a single process that performs both machine learning and graphics, or could be a pair of processes—one performing machine learning and one performing graphics. In any event, details of the processing to be performed is communicated to a driver 125 using a graphics API, such as OpenGL, DirectX, Metal or Vulkan. At a step 1230, the driver 125 interprets the processing to be performed. The driver 125 determines how to perform the processing on the resources available (e.g. at the GPU 175/875 and/or the CPU 115 itself). At step 1240, the driver 125 generates the necessary data for the process to be performed by, e.g. the GPU 175/875. This includes a job list including a list of tasks to be performed, together with any dependencies between those tasks. This might also include task affinity information that indicates whether multiple specific tasks should be started together or whether one shader core should be used to perform one specific task after another specific task. The generated information also indicates whether fetched data (kernels, input feature maps, and so on) should be broadcast to all the shader cores 110/810 or whether it should be unicast to a specific shader core 110/810. The driver 125 also generates data structures, programs (e.g. "shaders") to be executed on the GPU. These data structures, programs, job lists, affinity information and so on is written to, for instance, main memory 160. At a step 1245, the job manager (JM) 135/185 or command stream frontend (CSF) reads from the top of job list to determine whether there is any job in the job list that has no unmet dependencies. If the dependencies for a job are not met, then at step 1250, the process returns to step 1245. Otherwise, at step 1255, the job manager 135/185 determines whether there are any shader cores 110/810 that are unallocated (available). This step loops until such a core becomes available. Then, at step 1256, the job manager considers the affinity information as to whether a particular shader core 110/810 is better suited to the specific task. If so, then at step 1257, that shader core 110/810 is selected, if it is unallocated (available) and the process proceeds to step 1260. Otherwise, at step 1258, any of the unallocated (available) shader cores 110/810 is selected and the process proceeds to step 1260. At step 1260, the selected available shader core 110/810 is messaged with the job to be performed, and the corresponding job is removed from the job list. The selected shader core 110/810 then performs the job. At step 1265, it is determined whether more jobs exist in the job list. If so, the process returns to step 1245. Otherwise, the work dispatch process ends at step 1270.

Programs generated by the driver could anticipate the time taken to access main memory and therefore implement pre-fetching—that is, the fetching of data in advance of it being needed. This is often possible where machine learning is used due to the deterministic nature of machine learning operations and memory accesses. In some examples, although generated programs may be provided to all shader cores 110, such prefetching instructions can be configured to only be executed by one of the shader cores 110. This is because all shader cores 110 can benefit from the availability of the data in the cache 187 even if the prefetch request only came from one shader core 110. The core that performs the prefetching could be a pilot shader core, which does not perform the computations but merely fetches the required data to cause the data to be transferred from main memory 160 to the cache 187. Prefetching can also be provided by a dedicated prefetch engine in a shader core 110 or associated with a cache such as the level two cache 187.

Figure 13:
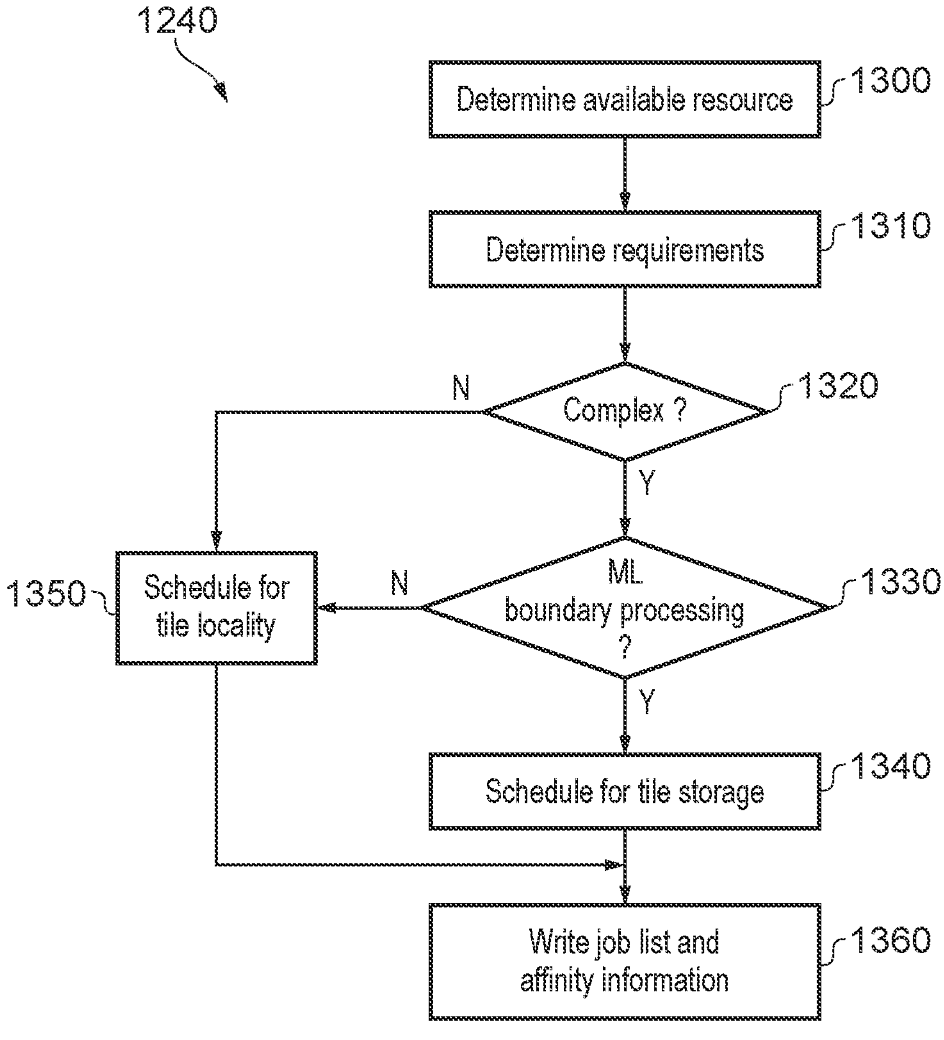
FIG. 13 shows the operation of the driver in the work dispatch process.

The operation of the driver 125 in the work dispatch process in step 1240 is now shown in more detail with reference to FIG. 13. At a step 1300, the driver determines what resource is available. For instance, for a GPU this might consider the number of shader cores, the size and number of tile buffers, and so on. At a step 1310, the requirements are determined. This may include the number of tiles that are to be produced (e.g. by dividing the resolution of a rendered image by the tile size), whether regular or complex rendering (which includes a machine learning component) is to be performed, and so on. At step 1320, the process depends on whether complex rendering is being performed or not. If not then scheduling is performed in order to improve tile locality. That is, the job list and affinity information are designed so that jobs near to each other in the list process the same or nearby tiles. This helps to reduce the number of accesses to the main memory 160, since the data required for one tile is likely to be used for another nearby tile. Since the GPU makes use of its own cache 187/887, the data fetched by one tile will likely be in the cache 187/887 and nearby tile memory accesses may be fulfilled partly by data that already resides in that cache 187/887. For instance, the tile processing might be ordered in the job list in z-order, Morton order, or via a Hilbert curve. The process then proceeds to step 1360 where the job list and affinity information is written (e.g. to main memory 160). Alternatively, if at step 1320, complex rendering is being performed, then the process proceeds to step 1330 where it is determined whether the ML processing that will be performed as part of the complex rendering occurs across a tile boundary (e.g. due to the receptive field of an OFM). If not, then the process proceeds to step 1350 where the job list is scheduled (and affinity information designed) to improve tile locality, as previously discussed. Otherwise, at step 1340, the scheduling occurs so as to improve tile storage and tile locality. This can be achieved, for instance, by operating on the tiles in stripes, e.g. by the processor cores collectively operating on one stripe of the frame, then collectively operating on a second stripe of the frame, and so on. By operating on tiles within each stripe simultaneously, the data for this tile is fetched from memory and may be present within local memory (e.g. a cache or other tile buffers) simultaneously. This means that when boundary processing occurs, which can necessitate data for other neighbouring tiles, it need not be retrieved from memory but can instead be quickly retrieved from the 'local memory'. The job list and affinity information is then written (e.g. to main memory 160) as previously described.

In practice, the job list is designed, taking the affinity information into account (e.g. so that tasks that have no dependencies are listed first). This helps the job manager 135 to act in a reactive manner. For instance, the driver may assume that particular resources are available that are not actually usable at a time of processing. By providing a job list together with the affinity information, the job manager is able to react to the truly available resources at a time processing is to be performed, i.e. by scheduling dynamically.

One of the dependencies that is to be considered by the job manager 135 at step 1250 involves layers of a neural network. In particular, processing for one layer of a neural network completes before the next layer of the neural network begins. As an alternative to the job manager tracking this dependency, it is possible to use a signalling or semaphore system between the shader cores 110/810. Here, a first shader core performs processing on a tile and performs convolution using a first kernel associated with a first layer of a neural network. The first shader core then signals to a second shader that processing on the tile is complete. The second shader core waits until this signal is received before performing convolution using a second kernel associated with a second layer of the neural network for the tile.

Although the processing required for machine learning is relatively deterministic and consistent across each layer, this is not necessarily true of graphics processing, which may differ between tiles due to the differing numbers of primitives present. It is therefore possible for some shader cores 110/810, with more simple tiles, to 'stall' waiting for other more complex tiles to complete. In particular, if a shader core 110/810 finishes its processing and does not have an empty tile buffer 120 then it is not able to perform any further processing without taking some action.

In some embodiments, the shader core 110/810 evicts the tile (e.g. by writing it back). If it is known that the data is likely to be re-used (e.g. for processing an adjacent tile) then the data can be marked as cacheable and write allocatable so that the data is written to the cache 187. This information can be derived by signalling between the shader cores 110/810. In some embodiments, a memory region can be specified as being coherent and the shader cores 110/810 and the cache 187 can access this memory region in a coherent manner. This can be used to signal which tiles have been accessed or will need to be accessed in the future and this can, in turn, be used to work out which tiles should be cached. In some embodiments, this memory region can be used to store the progress of a graphics processing operation (using atomic memory operations), which can be used as a guide as to when the adjacent tiles of data are likely to be required. This can be used to aid in the decision of whether and when to evict a local tile on the shader core 110/810. In particular, if a tile is required shortly then the tile may not be evicted so that it is easily available to other shader cores. In some embodiments, this information could also be used by the job manager 135 in scheduling tasks.

Figure 14:
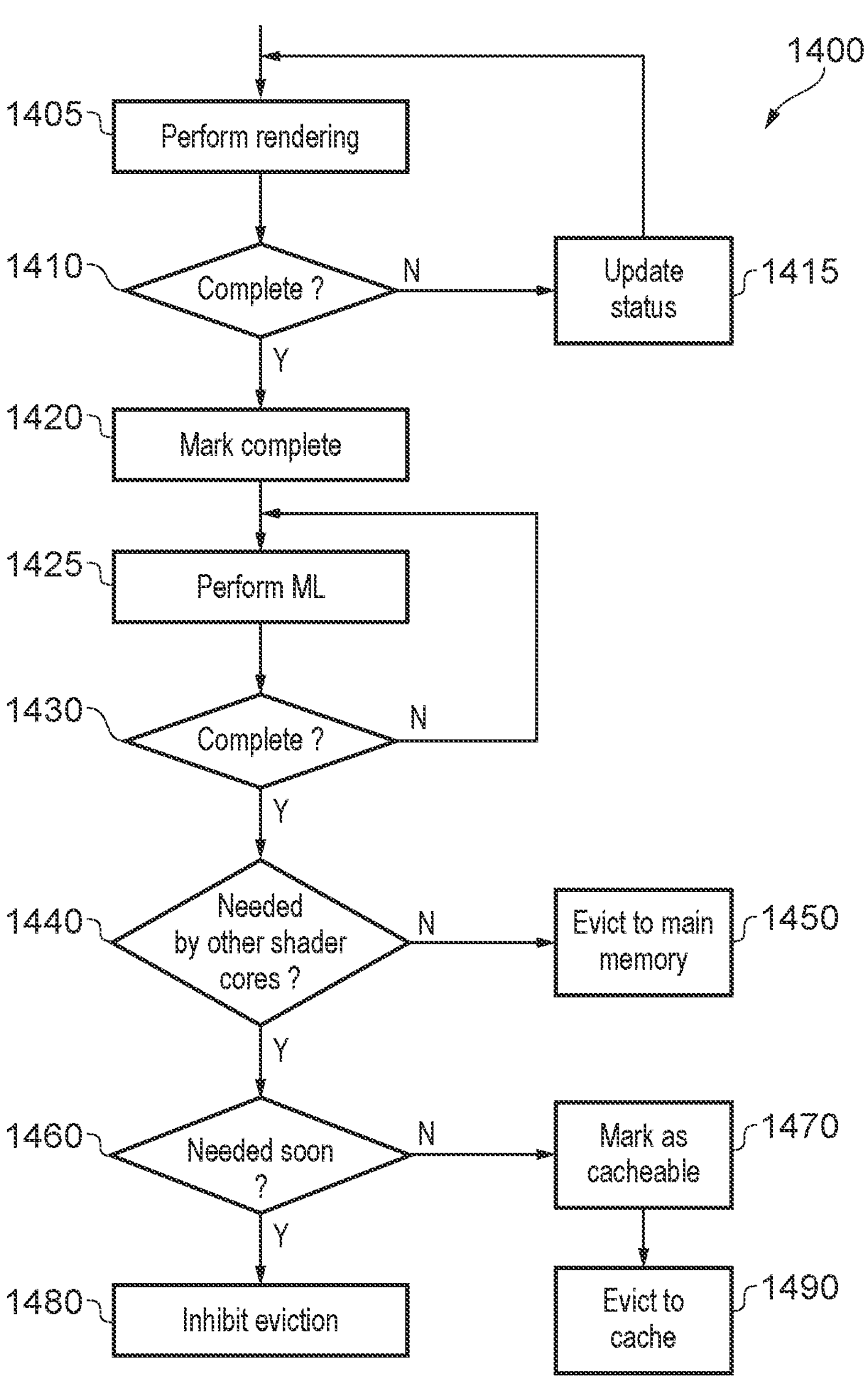
FIG. 14 shows, in the form of a flowchart, how an updated graphics rendering status can be used to decide how to use completed data.

This process is illustrated with respect to a flowchart 1400 in FIG. 14. At a step 1405, a rendering process is performed by the shader core 110/810. At a step 1410, it is determined whether this rendering process is complete. If not, then at step 1415, the current status of the rendering process is made (e.g. by an atomic memory operation) to a coherent area of memory and the process returns to step 1405 for further rendering to take place. Otherwise, at step 1420, the rendering process is marked (again by an atomic memory operation) as complete. Then at step 1425, a corresponding machine learning process is performed. At a step 1430, it is determined whether this is complete. If not, the process returns to step 1425 where further machine learning processing is performed. Otherwise, the process proceeds to step 1440. Here it is determined whether the result (or part of the result) might be needed by another shader core. This may be the case if the shader cores are performing machine learning operations that overlap tile boundaries for instance. If not, then the completed tile can be evicted (written back) to main memory 160. Otherwise, at step 1460, it is determined whether the data on the current tile is likely to be needed soon. This can be determined by reading the coherent memory region and looking at the status of other shader cores that will need data relating to the current tile. If it is below a threshold (e.g. a point at which other tasks could be completed by the current shader core) then the data will be needed 'soon' and so eviction of the result (or part thereof) is inhibited at step 1480 so that it can be accessed from the shader core when required. Otherwise, at step 1470, the result data is marked as cacheable and at step 1490, the result is evicted to the cache 1490. By evicting the data to the cache, the data can be retrieved relatively quickly (although not as quickly as it can be obtained from the shader core itself—where that is possible and permitted).

A further difficulty that can arise is that the processing to be performed on one shader core 110/810 may require data from adjacent tiles where that processing for those tiles has not yet completed. In this situation, signalling or the above mentioned coherent memory region can be used to determine if there are other tiles that can be processed instead.

As an alternative when faced with a stall, the partially processed tile can be written to memory together with meta data indicating which parts still need to be processed. The job manager 135 can then interrogate this meta data in order to reschedule the task to be completed when the necessary data becomes available. Meanwhile, the processor core that evicted the partially processed tile can continue with another task.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A tile-based graphics processing system comprising:

a shader core to perform a complex rendering process comprising a rendering process and a machine learning process, the shader core comprising:

one or more tile buffers configured to store data locally to the shader core; wherein during the rendering process of the complex rendering process, the one or more tile buffers are configured to store rendered fragment data relating to a tile; and during the machine learning process of the complex rendering process, the one or more tile buffers are configured to store machine learning data relating to the machine learning process, wherein the tile-based graphics processing system comprises a driver configured to generate a job list, wherein the driver is configured to determine whether at least part of a result of a task to perform the complex rendering process will be required by an other shader core, and in response to the determination being that the at least part of the result of the complex rendering process will be required by the another shader core, the driver is configured to cause the generation of task affinity information for the task.

2. The apparatus according to claim 1, wherein the machine learning data of the machine learning process are associated with the rendered fragment data generated during the rendering process.

3. The apparatus according to claim 1, wherein the rendering process is a rasterization, ray-tracing, or hybrid ray-tracing process that generate rendered fragment data relating to a tile.

4. The apparatus according to claim 1, wherein the stored rendered fragment data in the one or more tile buffers is used as the input by the machine learning process.

5. The apparatus according to claim 1, wherein the machine learning process performs an image enhancement process, such as temporal enhancement, anti-aliasing, up sampling, super resolution, or denoising.

6. The apparatus according to claim 1, wherein the complex rendering process performs the rendering process before performing the machine learning process.

7. The apparatus according to claim 1, wherein the rendered fragment data comprises an array of at least one of pixel values, surface normals, positions, materials, or depths.

8. The apparatus according to claim 1, wherein the shader core is configured to send a result of the complex rendering process to a storage circuit.

9. The apparatus according to claim 1, wherein the feature map corresponds to the tile; and the machine learning process is based on rendered fragment data corresponding to the tile and one or more neighbouring tiles of the tile.

10. The apparatus according claim 1, wherein a job manager that is configured to process the job list information generated by the driver, wherein the job manager is configured to determine whether the task has task affinity information, in response to the determination being that the task has task affinity information, the job manager is configured to cause the tasks with task affinity information to be process sequentially by a shader core, or the tasks with affinity information to be process substantially simultaneously by a plurality of shader cores.

11. The apparatus according to claim 9, wherein the apparatus is configured to determine whether at least part of a result of the complex rendering process will be required by an other apparatus; and in response to the determination being that the at least part of the result of the complex rendering process will be required by the other apparatus, the apparatus is configured to cause the at least part of the result of the complex rendering process to be preferentially stored in a cache.

12. The apparatus according to claim 11, wherein the apparatus is configured to communicate a status of the rendering process on the tile to a coherent area of memory.

13. The apparatus according to claim 11, wherein the apparatus is configured to obtain a status of the rendering process on the one or more neighbouring tiles of the tile from the coherent area of memory; and the apparatus is configured to evict the at least part of the result of the complex rendering process in dependence on the status of the rendering process on the one or more neighbouring tiles of the tile.

14. The apparatus according to claim 13, wherein the apparatus is configured to evict the at least part of the result of the complex rendering process when the status of the rendering process on the one or more neighbouring tiles indicates that the time to completion of the rendering process on the one or more neighbouring tiles is above a first threshold.

15. The apparatus according to claim 13, wherein the apparatus is configured to inhibit eviction of the at least part of the result of the complex rendering process when the status of the rendering process on the one or more neighbouring tiles indicates that the time to completion of the rendering process on the one or more neighbouring tiles is below or equal to the first threshold.

16. The apparatus according to claim 1, comprising:

comparison circuitry configured to compare a hash of the feature map with a hash of a result of performing the complex rendering process data and to store the result back to a storage circuit in dependence on the hash of the feature map and the hash of the result differing.

17. A complex rendering process comprising:

performing a rendering process of the complex rendering process in which one or more tile buffers are configured to store rendered fragment data relating to a tile; and performing a machine learning process of the complex rendering process in which the one or more tile buffers are configured to store machine learning data relating to the machine learning process, wherein generating a job list;

determining whether at least part of a result of a task to perform the complex rendering process will be required by an other shader core, and in response to determining that the at least part of the result of the complex rendering process will be required by the another shader core, causing the generation of task affinity information for the task.

18. The complex rendering process according to claim 17, wherein the machine learning data of the machine learning process are associated with the rendered fragment data generated during the rendering process.

19. A non-transitory computer-readable medium to store computer-readable code for fabrication of an apparatus configured to operate as a tile-based graphics processing system comprising:

a shader core configured to perform a complex rendering process comprising a rendering process and a machine learning process, the shader core comprising:

one or more tile buffers configured to store data locally to the shader core; wherein during the rendering process of the complex rendering process, the one or more tile buffers are configured to store rendered fragment data relating to a tile; and during the machine learning process of the complex rendering process, the one or more tile buffers are configured to store machine learning data relating to the machine learning process wherein the tile-based graphics processing system comprises a driver configured to generate a job list;

the driver is configured to determine whether at least part of a result of a task to perform the complex rendering process will be required by an other shader core; and in response to the determination being that the at least part of the result of the complex rendering process will be required by the another shader core, the driver is configured to cause the generation of task affinity information for the task.

20. A tile-based graphics processing system comprising:

a shader core to perform a complex rendering process comprising a rendering process and a machine learning process, the shader core comprising:

one or more tile buffers configured to store data locally to the shader core; wherein during the rendering process of the complex rendering process, the one or more tile buffers are configured to store rendered fragment data relating to a tile; and during the machine learning process of the complex rendering process, the one or more tile buffers are configured to store machine learning data relating to the machine learning process;

the feature map corresponds to the tile; and the machine learning process is based on rendered fragment data corresponding to the tile and one or more neighbouring tiles of the tile;

the apparatus is configured to determine whether at least part of a result of the complex rendering process will be required by an other apparatus; and in response to the determination being that the at least part of the result of the complex rendering process will be required by the other apparatus, the apparatus is configured to cause the at least part of the result of the complex rendering process to be preferentially stored in a cache.

21. A tile-based graphics processing system comprising:

a shader core to perform a complex rendering process comprising a rendering process and a machine learning process, the shader core comprising:

one or more tile buffers configured to store data locally to the shader core; wherein during the rendering process of the complex rendering process, the one or more tile buffers are configured to store rendered fragment data relating to a tile; and during the machine learning process of the complex rendering process, the one or more tile buffers are configured to store machine learning data relating to the machine learning process comparison circuitry configured to compare a hash of the feature map with a hash of a result of performing the complex rendering process data and to store the result back to a storage circuit in dependence on the hash of the feature map and the hash of the result differing.

* * * * *